(12) United States Patent
Iwashita et al.

(10) Patent No.: US 12,614,252 B2
(45) Date of Patent: Apr. 28, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Atsushi Iwashita, Tokyo (JP); Kosuke Terui, Kanagawa (JP); Ryuichi Fujimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 651 days.

(21) Appl. No.: 18/156,448

(22) Filed: Jan. 19, 2023

(65) Prior Publication Data

US 2023/0153970 A1 May 18, 2023

Related U.S. Application Data

(63) Continuation of application No. PCT/JP2021/034583, filed on Sep. 21, 2021.

(30) Foreign Application Priority Data

Sep. 29, 2020 (JP) ................................. 2020-163885

(51) Int. Cl.
  *G06T 5/50* (2006.01)
  *G01N 23/04* (2018.01)
  (Continued)

(52) U.S. Cl.
  CPC .............. *G06T 5/50* (2013.01); *G01N 23/04* (2013.01); *G01N 23/083* (2013.01); *G06T 7/11* (2017.01);
  (Continued)

(58) Field of Classification Search
  CPC ..... G06T 5/50; G06T 7/11; G06T 7/60; G06T 2207/10121; G06T 2207/20021;
  (Continued)

(56) References Cited

U.S. PATENT DOCUMENTS 5,774,520 A * 6/1998 Bolotin ................ G01B 15/025
                                            378/53
9,035,265 B2 5/2015 Yagi et al.
  (Continued)

FOREIGN PATENT DOCUMENTS

JP     2002-171444 A     6/2002
JP     2008-167948 A     7/2008
  (Continued)

OTHER PUBLICATIONS

International Search Report issued by the Japan Patent Office on Dec. 14, 2021 in corresponding International Application No. PCT/JP2021/034583, with English translation.
  (Continued)

*Primary Examiner* — Mekonen T Bekele
(74) *Attorney, Agent, or Firm* — Carter, DeLuca & Farrell LLP

(57) ABSTRACT

An image processing apparatus comprises a processing unit configured to performing energy subtraction processing using information concerning a plurality of attenuation rates corresponding to a plurality of radiation energies that are different from each other and are obtained by performing imaging in which an object is irradiated with radiation. The processing unit estimates attenuation information of a decomposition target material contained in the object using at least one image obtained by the energy subtraction processing, and generates an image concerning the decom-
  (Continued)

position target material using the attenuation information and the information concerning the plurality of attenuation rates.

18 Claims, 12 Drawing Sheets

(51) Int. Cl.
  *G01N 23/083*     (2018.01)
  *G06T 7/11*      (2017.01)
  *G06T 7/60*      (2017.01)

(52) U.S. Cl.
  CPC ............ *G06T 7/60* (2013.01); *G01N 2223/04* (2013.01); *G01N 2223/401* (2013.01); *G01N 2223/505* (2013.01); *G06T 2207/10121* (2013.01); *G06T 2207/20021* (2013.01); *G06T 2207/20224* (2013.01); *G06T 2207/30008* (2013.01)

(58) Field of Classification Search
  CPC .......... G06T 2207/20224; G06T 2207/30008; G01N 23/04; G01N 23/083; G01N 2223/04; G01N 2223/401; G01N 2223/505; G01N 2223/402; G01N 2223/424; G01N 2223/6123; G01N 2223/6126; A61B 6/482; A61B 6/505; A61B 6/5217; A61B 6/00
  See application file for complete search history.

(56)         References Cited

U.S. PATENT DOCUMENTS

| | | | |
|---|---|---|---|
| 9,239,390 | B2 | 1/2016 | Sato et al. |
| 9,360,562 | B2 | 6/2016 | Sato et al. |
| 9,417,333 | B2 | 8/2016 | Sato et al. |
| 9,910,169 | B2 | 3/2018 | Iwashita et al. |
| 10,234,574 | B2 | 3/2019 | Iwashita et al. |
| 11,422,098 | B2 | 8/2022 | Iwashita et al. |
| 2014/0320685 | A1 | 10/2014 | Takenaka et al. |
| 2020/0408933 | A1 | 12/2020 | Iwashita et al. |
| 2022/0365004 | A1 | 11/2022 | Iwashita et al. |

FOREIGN PATENT DOCUMENTS

| | | | |
|---|---|---|---|
| JP | 2009291271 A | * | 12/2009 |
| JP | 2010-187991 A | | 9/2010 |
| JP | 2018-134205 A | | 8/2018 |
| JP | 2019-162359 A | | 9/2019 |
| JP | 2019-202078 A | | 11/2019 |
| JP | 2020-000461 A | | 1/2020 |
| JP | 2020-103571 A | | 7/2020 |

OTHER PUBLICATIONS

Notice of Reasons for Refusal issued by the Japanese Patent Office on Sep. 27, 2024 in corresponding JP Patent Application No. 2020-163885, with English translation.

* cited by examiner

F I G. 1
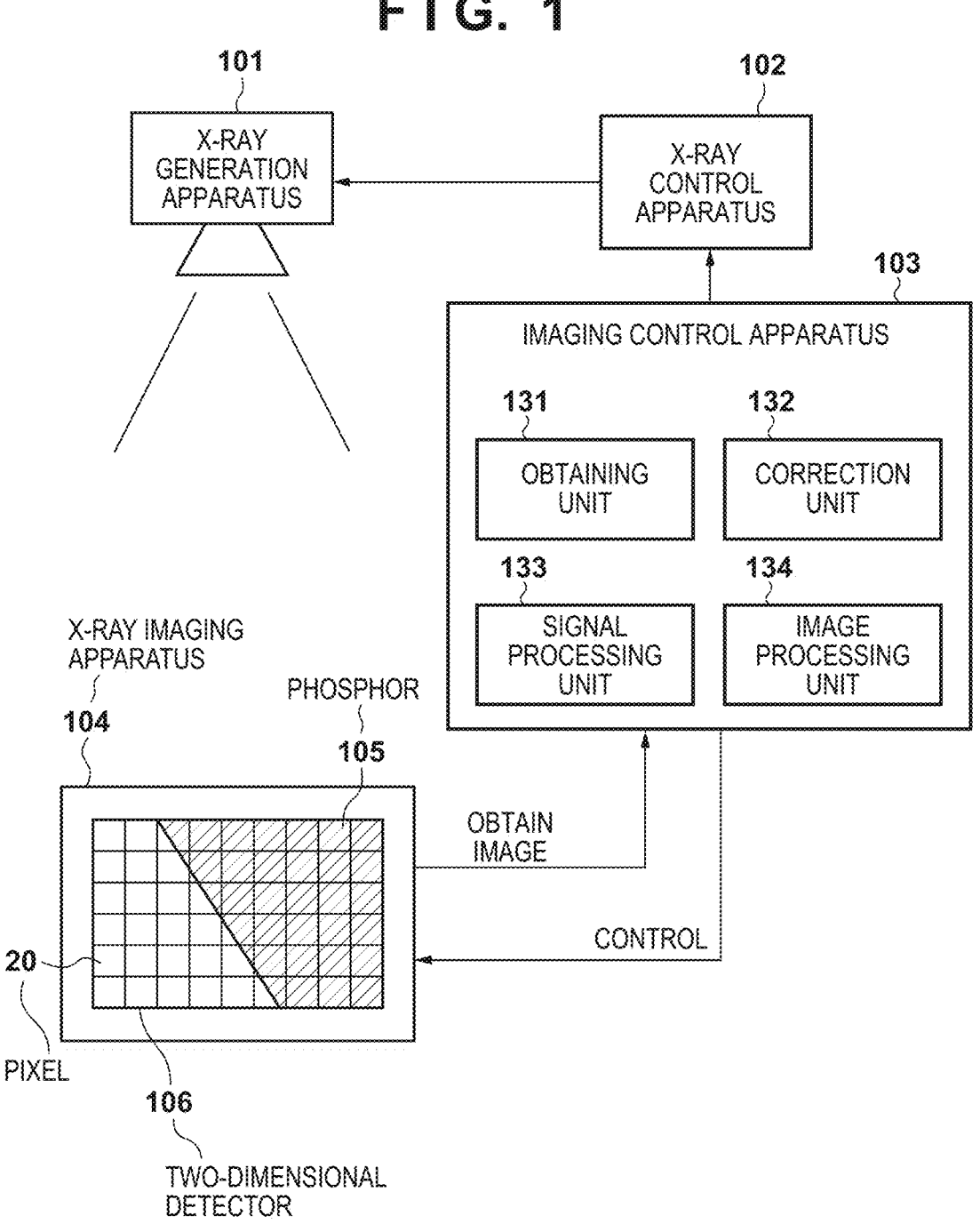

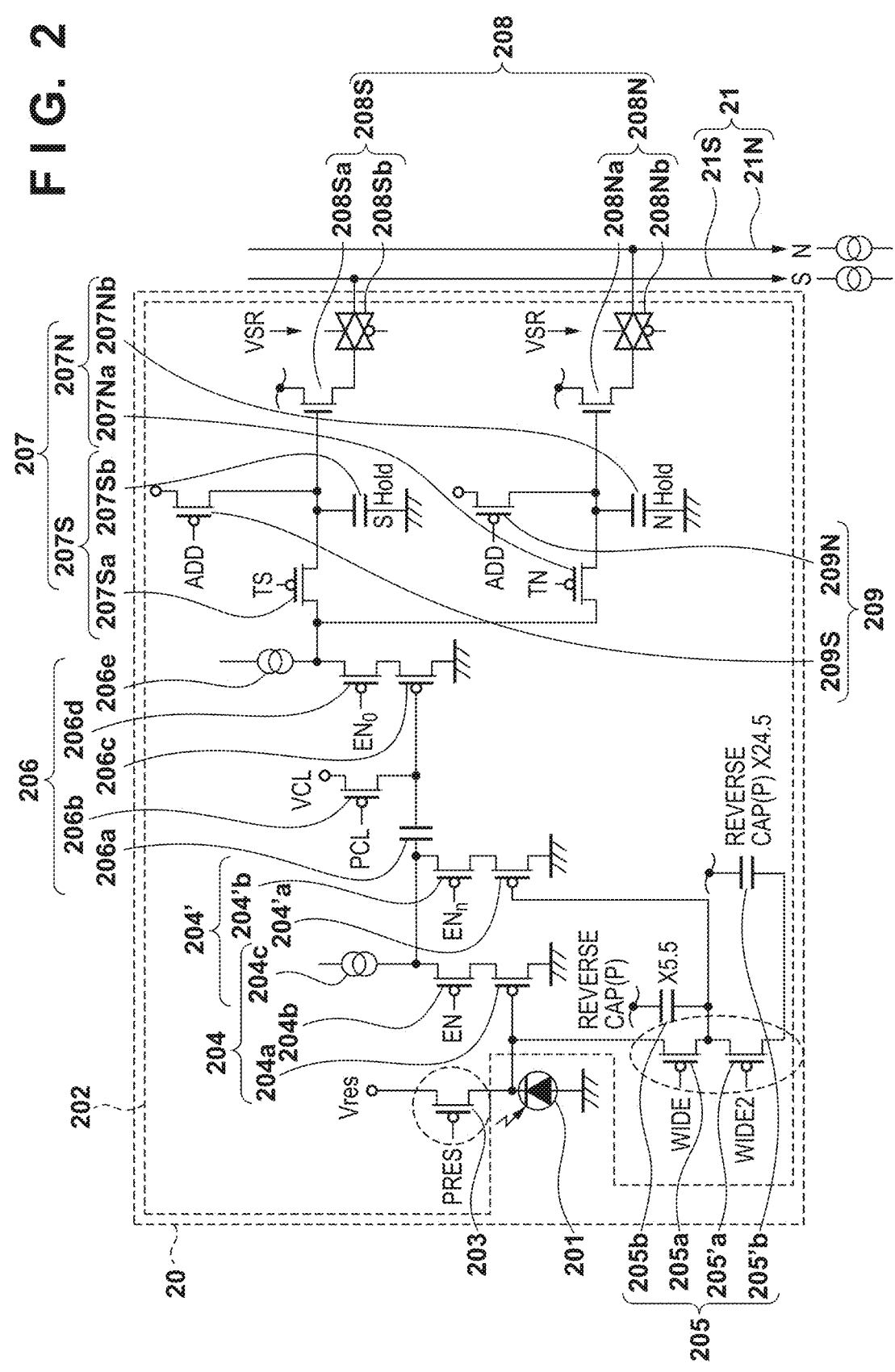
F I G. 2

F I G. 5
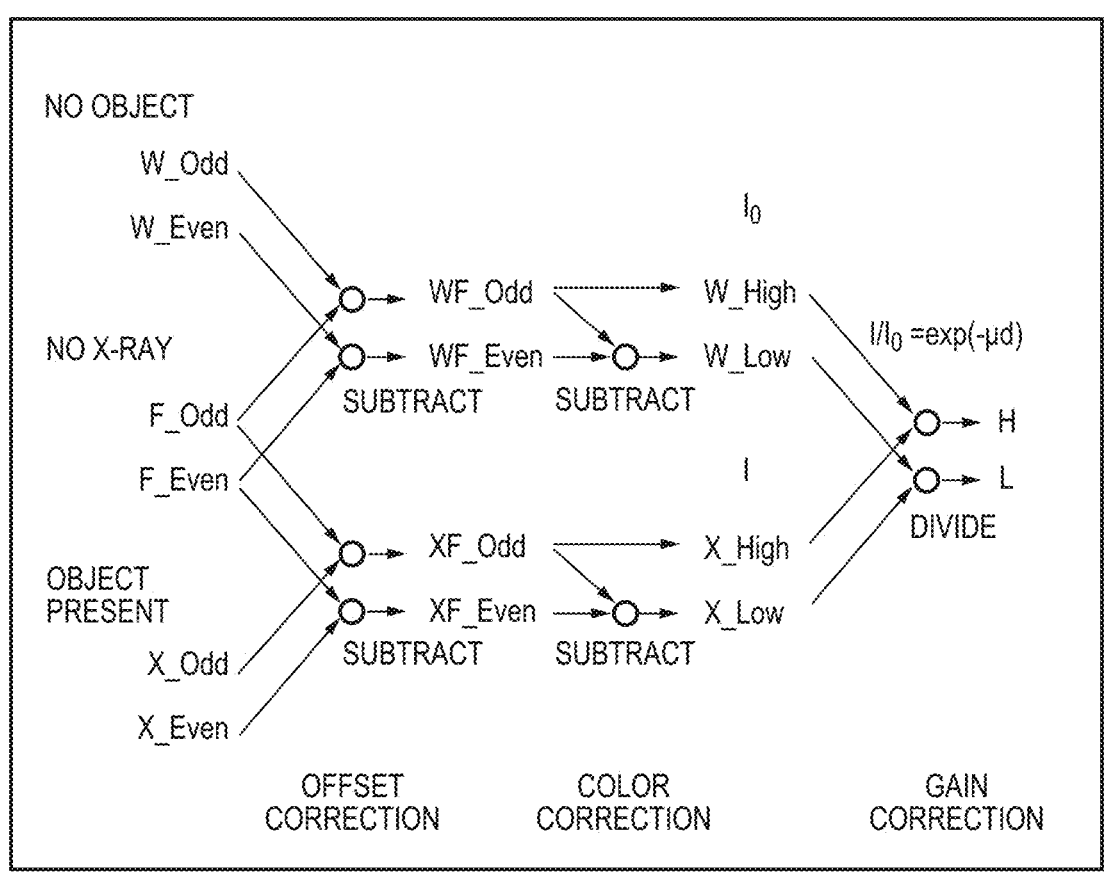
F I G. 6
H ——————→ [ ] ——————→ B
L ·············→ [ ] ·············→ S
F I G. 7
H ——————→ [ ] ——————→ Z
L ——————→ [ ] ——————→ D

F I G.  8
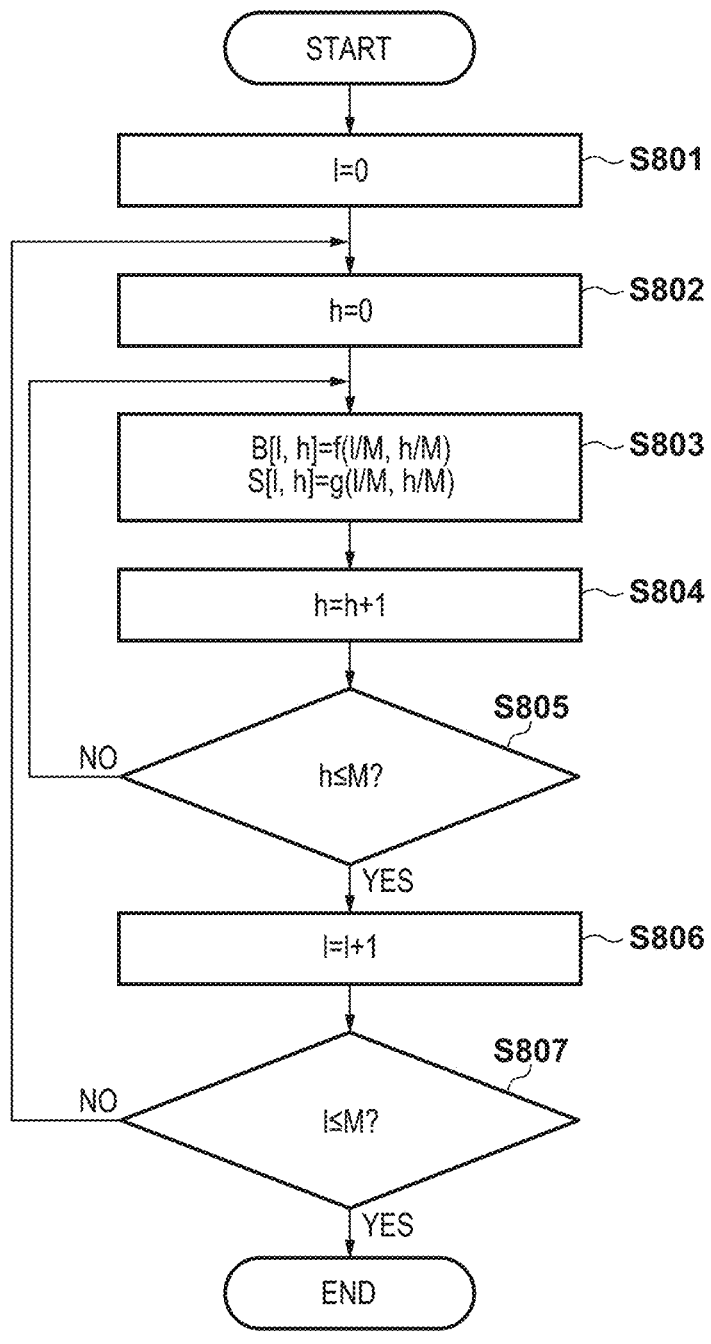

B →

S →

⤳ T

START

| CAPTURE MASK | ~ S1101 |
|---|---|

| INJECT CONTRAST AGENT | ~ S1102 |

| LIVE CAPTURE | ~ S1103 |

| ES PROCESSING | ~ S1104 |

| DSA | ~ S1105 |

S1106

NO ◁ INSTRUCTION FOR TERMINATION? ▷

YES

END

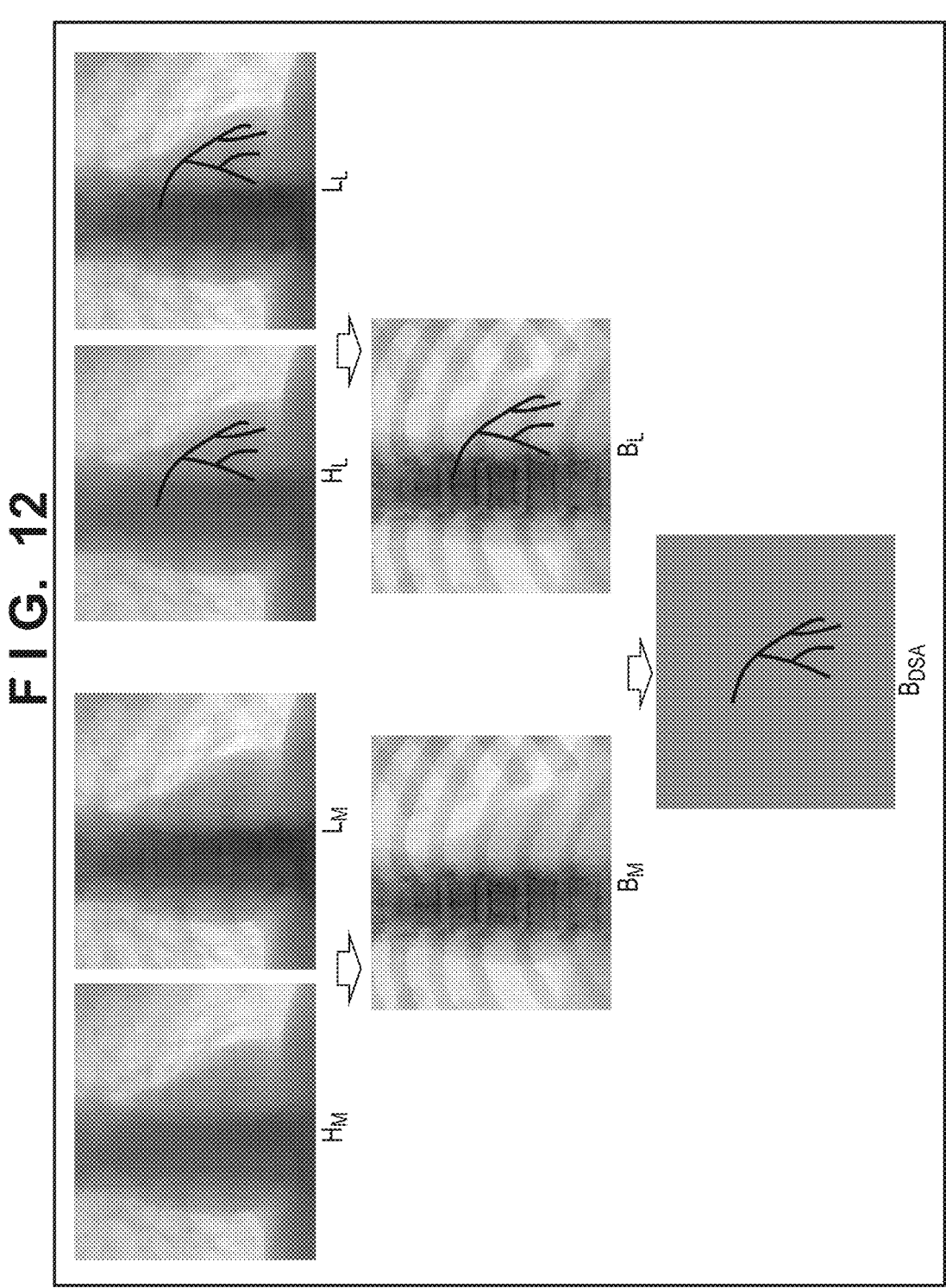
F I G. 12

F I G.  13
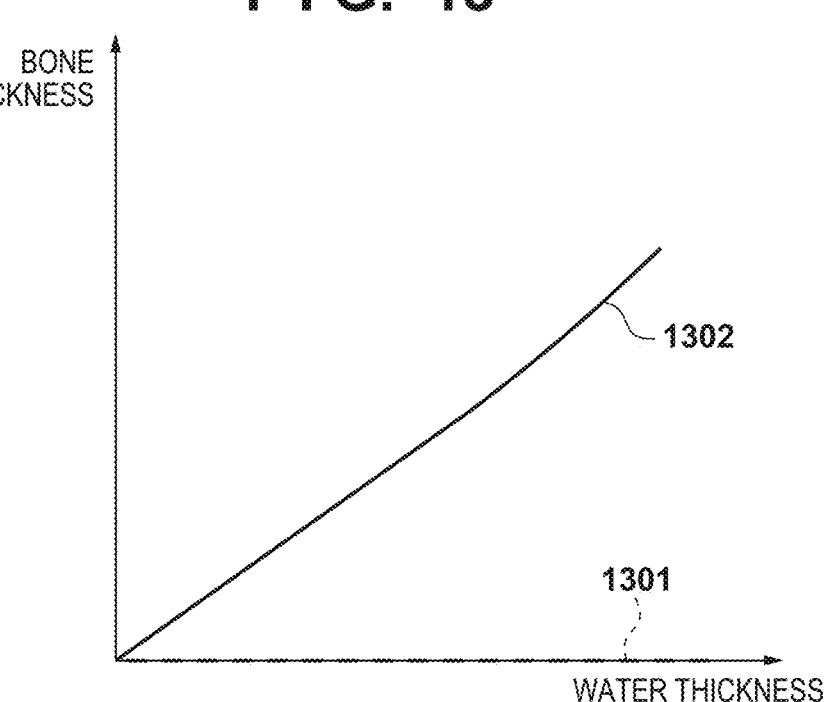
F I G.  14
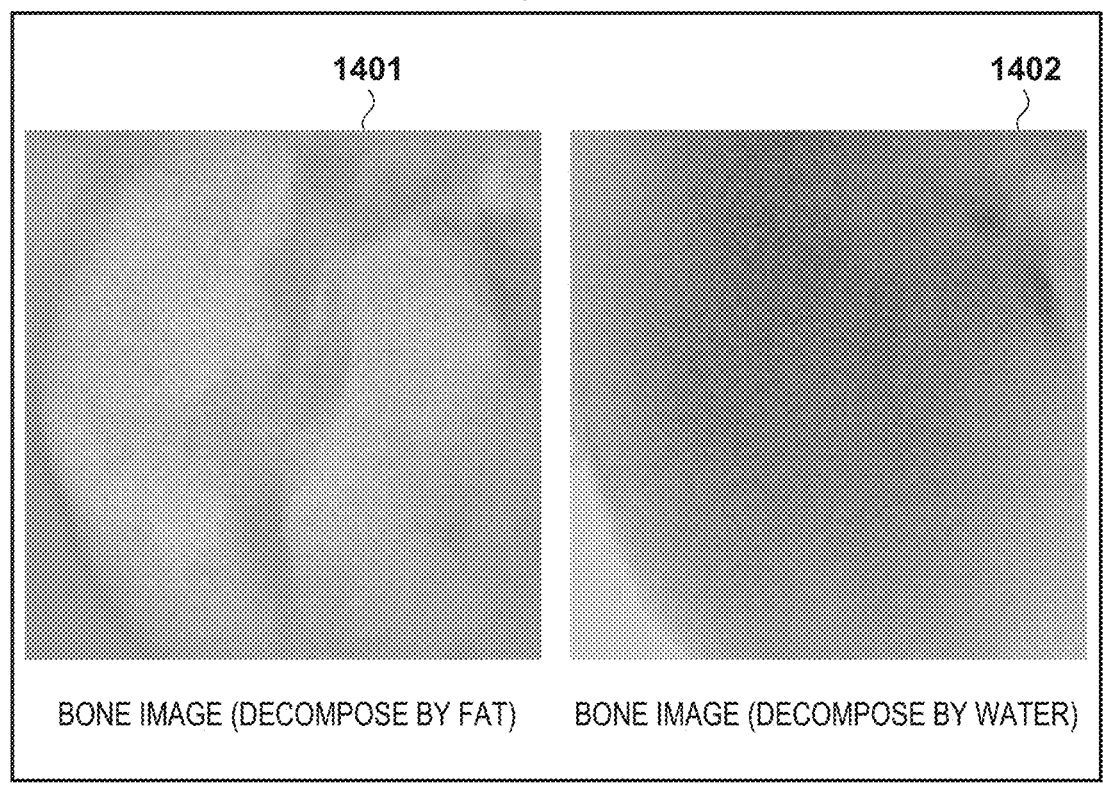
BONE IMAGE (DECOMPOSE BY FAT)     BONE IMAGE (DECOMPOSE BY WATER)

F I G. 17
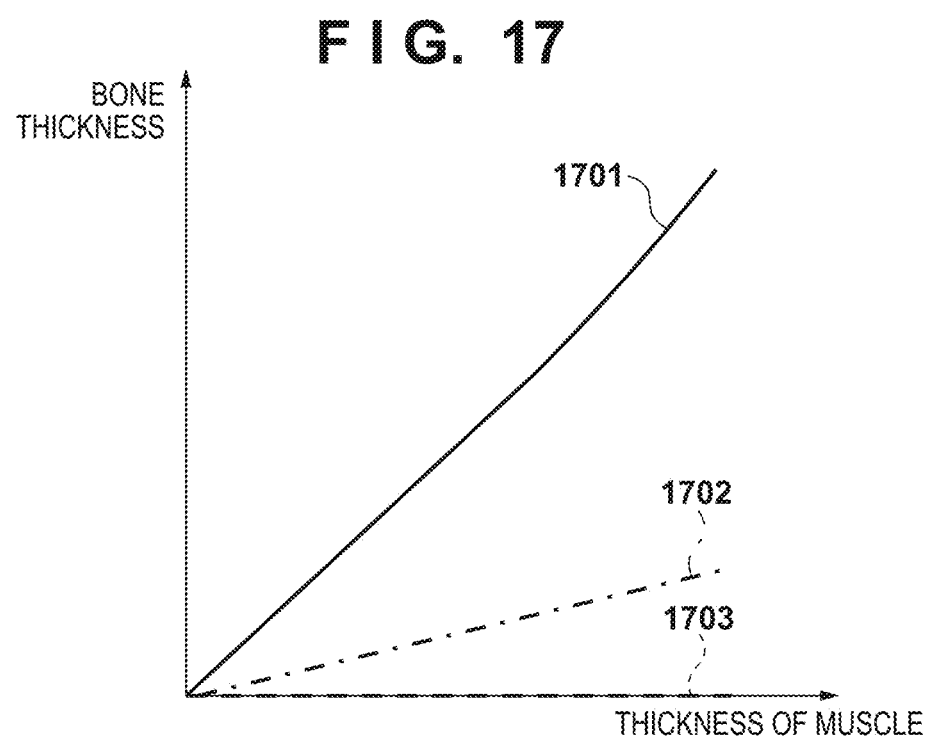
F I G. 18
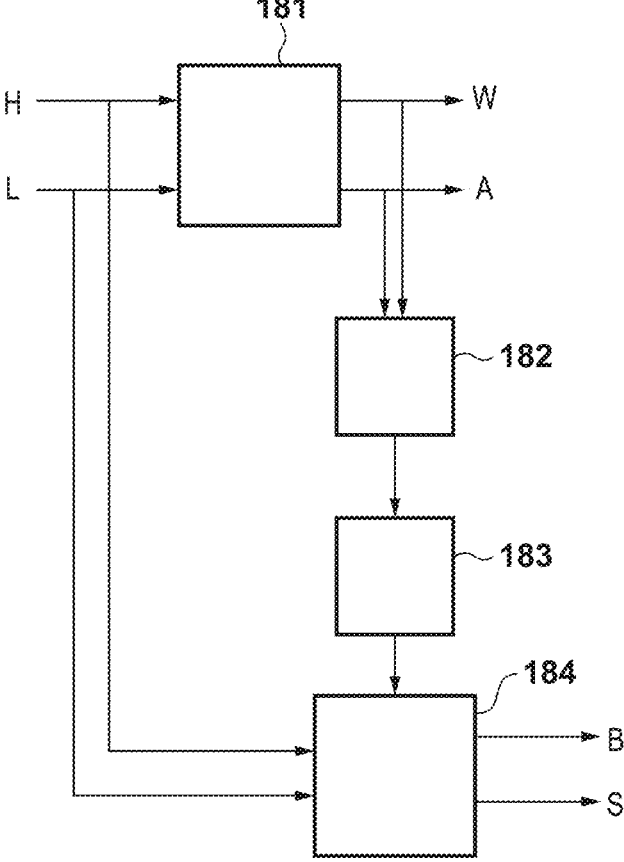

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2021/034583, filed Sep. 21, 2021, which claims the benefit of Japanese Patent Application No. 2020-163885, filed Sep. 29, 2020, both of which are hereby incorporated by reference herein in their entirety.

BACKGROUND OF THE INVENTION

Field of the Invention

The present invention relates to an image processing apparatus, an image processing method, and a non-transitory computer-readable storage medium and, more particularly, to an image processing apparatus for processing an image captured by a radiation imaging apparatus and a radiation imaging system used for still image capturing such as general imaging or moving image capturing such as fluoroscopic imaging in medical diagnosis, an image processing method, and a non-transitory computer-readable storage medium.

Background Art

A radiation imaging apparatus using a flat panel detector (to be abbreviated as an FPD hereinafter) is recently widespread as an imaging apparatus used for medical imaging diagnosis or non-destructive inspection by X-rays. Such a radiation imaging apparatus is used as a digital imaging apparatus for still image capturing like general imaging or moving image capturing like fluoroscopic imaging in, for example, medical imaging diagnosis.

An imaging method using an FPD is energy subtraction. In energy subtraction, a plurality of images of different energies are obtained by, for example, emitting X-rays of different tube voltages. Processing such as calculating those images to separate them into a bone image and a soft tissue image can be performed (Japanese Patent Laid-Open No. 2008-167948).

When a bone image or a soft tissue image is generated using energy subtraction, the structure of a soft tissue may remain in the bone image, or the structure of a bone may remain in the soft tissue image. An erase residue of an unnecessary structure may impede a diagnosis.

The present invention provides an image processing technique capable of reducing an erase residue of an unnecessary structure, which may occur in an image after energy subtraction.

SUMMARY OF THE INVENTION

According to one aspect of the present invention, there is provided an image processing apparatus that generates an image of a first material and an image of a second material contained in an object, comprising: a processing unit configured to performing energy subtraction processing using information concerning a plurality of attenuation rates corresponding to a plurality of radiation energies that are different from each other and are obtained by performing imaging in which the object is irradiated with radiation, wherein the processing unit estimates attenuation information of the first material, (a) using at least one of information concerning an effective atomic number and information concerning a surface density that are obtained by the energy subtraction processing, or (b) using at least one of information concerning a thickness of a third material and information concerning a thickness of a fourth material that are contained in the first material obtained by the energy subtraction processing, and generates an image of the first material and an image of the second material using the attenuation information and the information concerning the plurality of attenuation rates.

According to another aspect of the present invention, there is provided an image processing apparatus comprising a processing unit configured to performing energy subtraction processing using information concerning a plurality of attenuation rates corresponding to a plurality of radiation energies that are different from each other and are obtained by performing imaging in which an object is irradiated with radiation, wherein the processing unit estimates attenuation information of a decomposition target material contained in the object using at least one image obtained by the energy subtraction processing, and generates an image concerning the decomposition target material using the attenuation information and the information concerning the plurality of attenuation rates.

Further features of the present invention will become apparent from the following description of exemplary embodiments with reference to the attached drawings.

BRIEF DESCRIPTION OF THE DRAWINGS

FIG. 1 is a view showing an example of the configuration of an X-ray imaging system according to an embodiment.

FIG. 2 is an equivalent circuit diagram of a pixel in an X-ray imaging apparatus according to the embodiment.

FIG. 5 is a view for explaining correction processing according to the embodiment.

FIG. 6 is a block diagram of signal processing according to the embodiment.

FIG. 7 is a block diagram of signal processing according to the embodiment.

FIG. 8 is a flowchart for explaining the procedure of table generation according to the embodiment.

FIG. 12 is a schematic view of image processing according to the embodiment.

FIG. 13 is a view showing the relationship between an actual water thickness and a calculated bone thickness.

FIG. 14 is a schematic view of image processing according to the embodiment.

FIG. 17 is a view showing the relationship between an actual muscle thickness and a calculated bone thickness.

FIG. 18 is a block diagram of signal processing according to the second embodiment.

DESCRIPTION OF THE EMBODIMENTS

Figure 3:
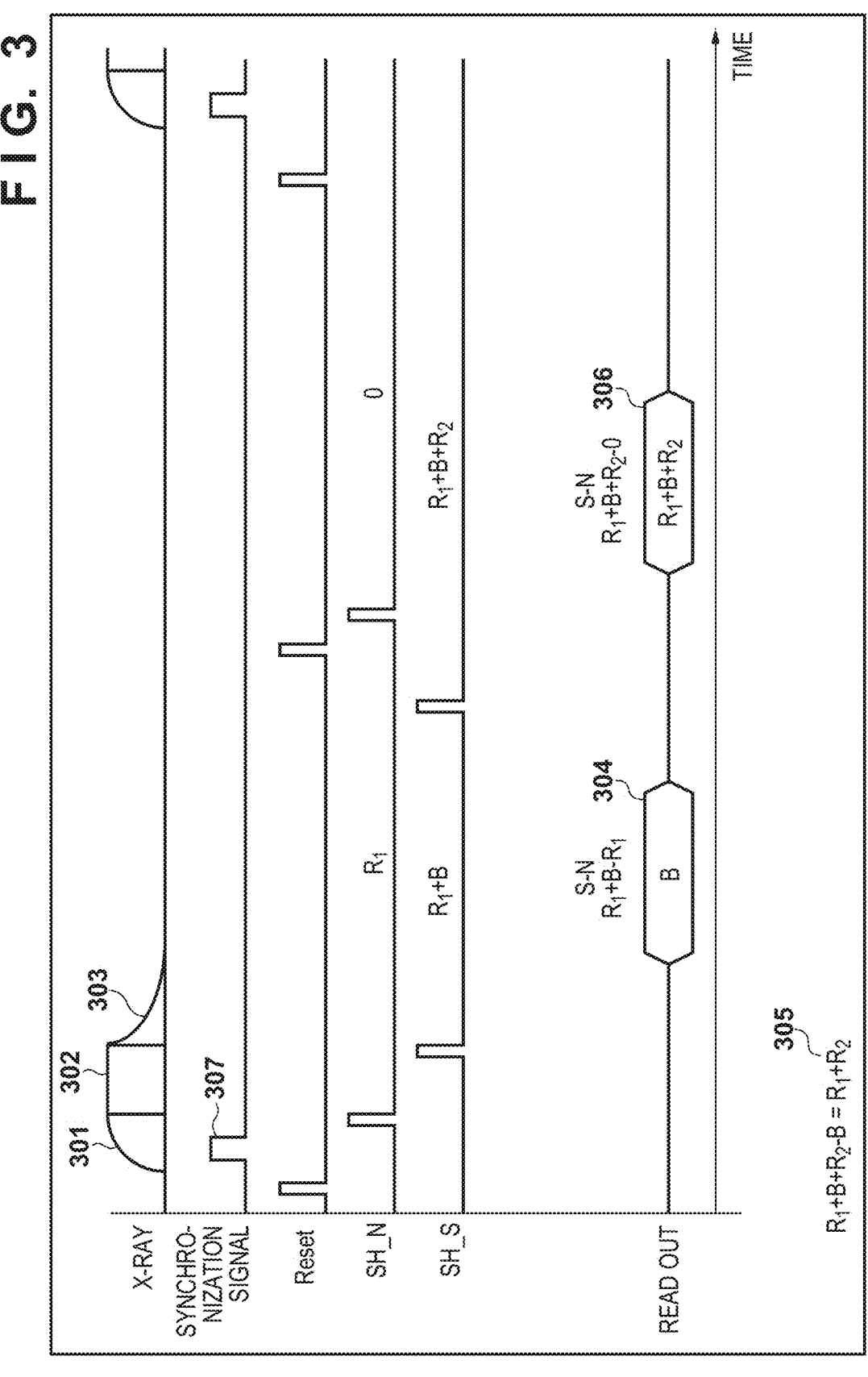
FIG. 3 is a timing chart of the X-ray imaging apparatus according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

Note that it is assumed that radiation according to the present invention includes not only α-rays, β-rays, and γ-rays that are beams generated by particles (including photons) emitted by radioactive decay but also beams having equal or more energy, for example, X-rays, particle rays, and cosmic rays. In the following embodiments, an apparatus using X-rays as an example of radiation will be described. Therefore, X-rays, an X-ray image, X-ray energy, an X-ray spectrum, an X-ray dose, an X-ray generation apparatus, an X-ray imaging apparatus, and an X-ray imaging system will be described as radiation, a radiation image, radiation energy, a radiation spectrum, a radiation dose, a radiation generation apparatus, a radiation imaging apparatus, and a radiation imaging system, respectively.

First Embodiment

FIG. 1 is a block diagram showing an example of the configuration of an X-ray imaging system as an example of a radiation imaging system according to the first embodiment. The X-ray imaging system according to the first embodiment includes an X-ray generation apparatus 101, an X-ray control apparatus 102, an imaging control apparatus 103, and an X-ray imaging apparatus 104.

The X-ray generation apparatus 101 generates X-rays and irradiates an object with the X-rays. The X-ray control apparatus 102 controls generation of X-rays in the X-ray generation apparatus 101. The imaging control apparatus 103 includes, for example, one or a plurality of processors (CPUs) and a memory, and the processor executes a program stored in the memory to obtain an X-ray image and perform image processing. Note that each of processes including the image processing performed by the imaging control apparatus 103 may be implemented by dedicated hardware or by cooperation of hardware and software. The X-ray imaging apparatus 104 includes a phosphor 105 that converts X-rays into visible light, and a two-dimensional detector 106 that detects visible light. The two-dimensional detector is a sensor in which pixels 20 for detecting X-ray quanta are arranged in an array of X columns×Y rows, and outputs image information.

The imaging control apparatus 103 functions as an image processing apparatus that processes a radiation image by the above-described processor. An obtaining unit 131, a correction unit 132, a signal processing unit 133, and an image processing unit 134 indicate examples of the functional components of an image processing apparatus. The image processing apparatus processes a radiation image, thereby generating an image of a first material included in an object and an image of a second material. Here, the first material included in the object is, for example, a soft tissue, and the second material is, for example, a bone. The obtaining unit

131 obtains a plurality of radiation images corresponding to a plurality of different radiation energies obtained by irradiating an object with radiation and performing imaging. The correction unit 132 generates images of a plurality of attenuation rates (for example, an image L of an attenuation rate of low energy and an image H of an attenuation rate of high energy as shown in FIG. 5) to be used for energy subtraction processing by correcting the plurality of radiation images obtained by the obtaining unit 131.

The signal processing unit 133 generates a material characteristic image by energy subtraction processing using the images of the plurality of attenuation rates generated by the correction unit 132. The material characteristic image is an image obtained in the energy subtraction processing, such as a material decomposition image representing a decomposed material like a first material (for example, a soft tissue) and a second material (for example, a bone), and a material identification image representing an effective atomic number and its surface density. Details of the signal processing unit 133 will be described later. The image processing unit 134 performs processing of obtaining a DSA image using the material characteristic image obtained by the signal processing unit 133 and generating a moving image by combining energy subtraction and DSA. Details of the image processing unit 134 will be described later.

FIG. 2 is an equivalent circuit diagram of the pixel 20 according to the first embodiment. The pixel 20 includes a photoelectric converting element 201 and an output circuit unit 202. The photoelectric converting element 201 can typically be a photodiode. The output circuit unit 202 includes an amplification circuit unit 204, a clamp circuit unit 206, a sample and hold circuit unit 207, and a selection circuit unit 208.

The photoelectric converting element 201 includes a charge accumulation portion. The charge accumulation portion is connected to the gate of a MOS transistor 204a of the amplification circuit unit 204. The source of the MOS transistor 204a is connected to a current source 204c via a MOS transistor 204b. The MOS transistor 204a and the current source 204c form a source follower circuit. The MOS transistor 204b is an enable switch that is turned on when an enable signal EN supplied to its gate is set at an active level, and sets the source follower circuit in an operation state.

In the example shown in FIG. 2, the charge accumulation portion of the photoelectric converting element 201 and the gate of the MOS transistor 204a form a common node, and this node functions as a charge-voltage converter that converts charges accumulated in the charge accumulation portion into a voltage. That is, a voltage V (=Q/C) determined by charges Q accumulated in the charge accumulation portion and a capacitance value C of the charge-voltage converter appears in the charge-voltage converter. The charge-voltage converter is connected to a reset potential Vres via a reset switch 203. When a reset signal PRES is set at an active level, the reset switch 203 is turned on, and the potential of the charge-voltage converter is reset to the reset potential Vres.

The clamp circuit unit 206 clamps, by a clamp capacitor 206a, noise output from the amplification circuit unit 204 in accordance with the reset potential of the charge-voltage converter. That is, the clamp circuit unit 206 is a circuit configured to cancel the noise from a signal output from the source follower circuit in accordance with charges generated by photoelectric conversion in the photoelectric converting element 201. The noise includes kTC noise at the time of reset. Clamping is performed by turning on a MOS transistor 206*b* by setting a clamp signal PCL at an active level, and then turning off the MOS transistor 206*b* by setting the clamp signal PCL at an inactive level. The output side of the clamp capacitor 206*a* is connected to the gate of a MOS transistor 206*c*. The source of the MOS transistor 206*c* is connected to a current source 206*e* via a MOS transistor 206*d*. The MOS transistor 206*c* and the current source 206*e* form a source follower circuit. The MOS transistor 206*d* is an enable switch that is turned on when an enable signal ENO supplied to its gate is set at an active level, and sets the source follower circuit in an operation state.

The signal output from the clamp circuit unit 206 in accordance with charges generated by photoelectric conversion in the photoelectric converting element 201 is written, as an optical signal, in a capacitor 207Sb via a switch 207Sa when an optical signal sampling signal TS is set at an active level. The signal output from the clamp circuit unit 206 when turning on the MOS transistor 206*b* immediately after resetting the potential of the charge-voltage converter is a clamp voltage. The noise signal is written in a capacitor 207Nb via a switch 207Na when a noise sampling signal TN is set at an active level. This noise signal includes an offset component of the clamp circuit unit 206. The switch 207Sa and the capacitor 207Sb form a signal sample and hold circuit 207S, and the switch 207Na and the capacitor 207Nb form a noise sample and hold circuit 207N. The sample and hold circuit unit 207 includes the signal sample and hold circuit 207S and the noise sample and hold circuit 207N.

When a driving circuit unit drives a row selection signal to an active level, the signal (optical signal) held in the capacitor 207Sb is output to a signal line 21S via a MOS transistor 208Sa and a row selection switch 208Sb. In addition, the signal (noise) held in the capacitor 207Nb is simultaneously output to a signal line 21N via a MOS transistor 208Na and a row selection switch 208Nb. The MOS transistor 208Sa forms a source follower circuit (not shown) with a constant current source provided on the signal line 21S. Similarly, the MOS transistor 208Na forms a source follower circuit (not shown) with a constant current source provided on the signal line 21N. The MOS transistor 208Sa and the row selection switch 208Sb form a signal selection circuit unit 208S, and the MOS transistor 208Na and the row selection switch 208Nb form a noise selection circuit unit 208N. The selection circuit unit 208 includes the signal selection circuit unit 208S and the noise selection circuit unit 208N.

The pixel 20 may include an addition switch 209S that adds the optical signals of the plurality of adjacent pixels 20. In an addition mode, an addition mode signal ADD is set at an active level, and the addition switch 209S is turned on. This causes the addition switch 209S to interconnect the capacitors 207Sb of the adjacent pixels 20, and the optical signals are averaged. Similarly, the pixel 20 may include an addition switch 209N that adds noise components of the plurality of adjacent pixels 20. When the addition switch 209N is turned on, the capacitors 207Nb of the adjacent pixels 20 are interconnected by the addition switch 209N, thereby averaging the noise components. An adder 209 includes the addition switches 209S and 209N.

Furthermore, the pixel 20 may include a sensitivity changing unit 205 for changing the sensitivity. The pixel 20 can include, for example, a first sensitivity change switch 205*a*, a second sensitivity change switch 205'*a*, and their circuit elements. When a first change signal WIDE is set at an active level, the first sensitivity change switch 205*a* is turned on to add the capacitance value of a first additional capacitor 205*b* to the capacitance value of the charge-voltage converter. This decreases the sensitivity of the pixel 20. When a second change signal WIDE2 is set at an active level, the second sensitivity change switch 205'*a* is turned on to add the capacitance value of a second additional capacitor 205'*b* to the capacitance value of the charge-voltage converter. This further decreases the sensitivity of the pixel 201. In this way, it is possible to receive a larger light amount by adding a function of decreasing the sensitivity of the pixel 20, thereby allowing widening of a dynamic range. When the first change signal WIDE is set at the active level, an enable signal ENw may be set at an active level to cause a MOS transistor 204'*a* to perform a source follower operation instead of the MOS transistor 204*a*.

The X-ray imaging apparatus 104 reads out the output of the above-described pixel circuit from the two-dimensional detector 106, causes an A/D converter (not shown) to covert the output into a digital value, and then transfers an image to the imaging control apparatus 103.

The operation of the X-ray imaging system having the above-described configuration according to the first embodiment will be described next. FIG. 3 shows the driving timing of the X-ray imaging apparatus 104 when obtaining a plurality of X-ray images of different energies to be provided to energy subtraction in the X-ray imaging system according to the first embodiment. When the abscissa represents the time, waveforms in FIG. 3 indicate timings of X-ray application, a synchronization signal, reset of the photoelectric converting element 201, the sample and hold circuit 207, and readout of an image from a signal line 21.

After the reset signal resets the photoelectric converting element 201, X-rays are applied. The tube voltage of the X-rays ideally has a rectangular waveform but it takes a finite time for the tube voltage to rise or fall. Especially, if pulsed X-rays are applied and the application time is short, the tube voltage is not considered to have a rectangular waveform any more, and has waveforms, as indicated by X-rays 301 to 303. The X-rays 301 during the rising period, the X-rays 302 during the stable period, and the X-rays 303 during the falling period have different X-ray energies. Therefore, by obtaining an X-ray image corresponding to radiation during a period divided by a sample and hold operation, a plurality of kinds of X-ray images of different energies are obtained.

The X-ray imaging apparatus 104 causes the noise sample and hold circuit 207N to perform sampling after application of the X-rays 301 during the rising period, and causes the signal sample and hold circuit 207S to perform sampling after application of the X-rays 302 during the stable period. After that, the X-ray imaging apparatus 104 reads out, as an image, the difference between the signal lines 21N and 21S. At this time, a signal $(R_1)$ of the X-rays 301 during the rising period is held in the noise sample and hold circuit 207N, and the sum $(R_1+B)$ of the signal of the X-rays 301 during the rising period and a signal (B) of the X-rays 302 during the stable period is held in the signal sample and hold circuit 207S. Therefore, an image 304 corresponding to the signal of the X-rays 302 during the stable period is read out.

Next, after completion of application of the X-rays 303 during the falling period and readout of the image 304, the X-ray imaging apparatus 104 causes the signal sample and hold circuit 207S to perform sampling again. After that, the X-ray imaging apparatus 104 resets the photoelectric converting element 201, causes the noise sample and hold circuit 207N to perform sampling again, and reads out, as an image, the difference between the signal lines 21N and 21S. At this time, a signal in a state in which no X-rays are applied is held in the noise sample and hold circuit 207N, and the sum $(R_1+B+R_2)$ of the signal of the X-rays 301 during the rising period, the signal of the X-rays 302 during the stable period, and a signal $(R_2)$ of the X-rays 303 during the falling period is held in the signal sample and hold circuit 207S. Therefore, an image 306 corresponding to the signal of the X-rays 301 during the rising period, the signal of the X-rays 302 during the stable period, and the signal of the X-rays 303 during the falling period is read out. After that, by calculating the difference between the images 306 and 304, an image 305 corresponding to the sum of the X-rays 301 during the rising period and the X-rays 303 during the falling period is obtained. This calculation processing may be performed by the X-ray imaging apparatus 104 or the imaging control apparatus 103.

The timing of resetting the sample and hold circuit 207 and the photoelectric converting element 201 is decided using a synchronization signal 307 indicating the start of application of X-rays from the X-ray generation apparatus 101. As a method of detecting the start of application of X-rays, a configuration for measuring the tube current of the X-ray generation apparatus 101 and determining whether the current value exceeds a preset threshold can be used but the present invention is not limited to this. For example, a configuration for detecting the start of application of X-rays by repeatedly reading out the pixel 20 and determining whether the pixel value exceeds a preset threshold after completion of the reset of the photoelectric converting element 201 may be used.

Alternatively, for example, a configuration for detecting the start of application of X-rays by incorporating an X-ray detector different from the two-dimensional detector 106 in the X-ray imaging apparatus 104 and determining whether a measured value of the X-ray detector exceeds a preset threshold may be used. In either method, after a time designated in advance elapses after the input of the synchronization signal 307 indicating the start of application of X-rays, sampling of the signal sample and hold circuit 207S, sampling of the noise sample and hold circuit 207N, and reset of the photoelectric converting element 201 are performed.

As described above, the image 304 corresponding to the stable period of the pulsed X-rays and the image 305 corresponding to the sum of the signal during the rising period and that during the falling period are obtained. Since the energies of the X-rays applied when forming the two X-ray images are different, calculation is performed for the X-ray images, thereby making it possible to perform energy subtraction processing.

Figure 4:
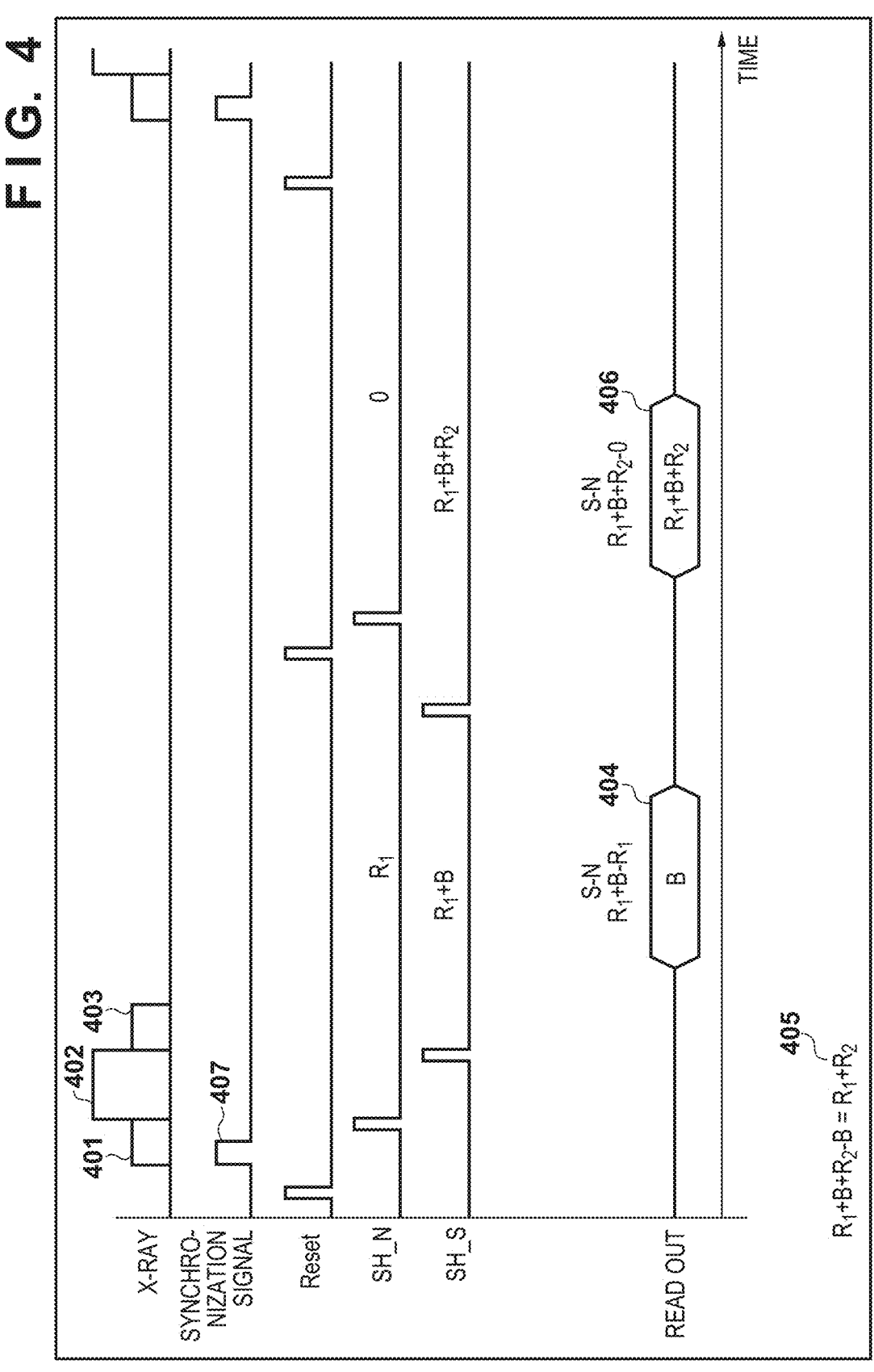
FIG. 4 is a timing chart of the X-ray imaging apparatus according to the embodiment.

FIG. 4 shows the driving timing, different from FIG. 3, of the X-ray imaging apparatus 104 when obtaining a plurality of X-ray images of different energies to be provided to energy subtraction in the X-ray imaging system according to the first embodiment. FIG. 4 is different from FIG. 3 in that the tube voltage of the X-ray generation apparatus 101 is actively switched.

First, after the reset of the photoelectric converting element 201, the X-ray generation apparatus 101 applies low energy X-rays 401. In this state, the X-ray imaging apparatus 104 causes the noise sample and hold circuit 207N to perform sampling. After that, the X-ray generation apparatus 101 switches the tube voltage to apply high energy X-rays 402. In this state, the X-ray imaging apparatus 104 causes the signal sample and hold circuit 207S to perform sampling. After that, the X-ray generation apparatus 101 switches the tube voltage to apply low energy X-rays 403. The X-ray imaging apparatus 104 reads out, as an image, the difference between the signal lines 21N and 21S. At this time, a signal $(R_1)$ of the low energy X-rays 401 is held in the noise sample and hold circuit 207N, and the sum $(R_1+B)$ of the signal of the low energy X-rays 401 and a signal (B) of the high energy X-rays 402 is held in the signal sample and hold circuit 207S. Therefore, an image 404 corresponding to the signal of the high energy X-rays 402 is read out.

Next, after completion of the application of the low energy X-rays 403 and the readout of the image 404, the X-ray imaging apparatus 104 causes the signal sample and hold circuit 207S to perform sampling again. After that, the X-ray imaging apparatus 104 resets the photoelectric converting element 201, causes the noise sample and hold circuit 207N to perform sampling again, and reads out, as an image, the difference between the signal lines 21N and 21S. At this time, a signal in a state in which no X-rays are applied is held in the noise sample and hold circuit 207N, and the sum $(R_1+B+R_2)$ of the signal of the low energy X-rays 401, the signal of the high energy X-rays 402, and a signal $(R_2)$ of the low energy X-rays 403 is held in the signal sample and hold circuit 207S. Therefore, an image 406 corresponding to the signal of the low energy X-rays 401, the signal of the high energy X-rays 402, and the signal of the low energy X-rays 403 is read out.

After that, by calculating the difference between the images 406 and 404, an image 405 corresponding to the sum of the low energy X-rays 401 and the low energy X-rays 403 is obtained. This calculation processing may be performed by the X-ray imaging apparatus 104 or the imaging control apparatus 103. With respect to a synchronization signal 407, the same as in FIG. 3 applies. As described above, by obtaining images while actively switching the tube voltage, the energy difference between radiation images of low energy and high energy can be made large, as compared with the method shown in FIG. 3.

Next, energy subtraction processing by the imaging control apparatus 103 will be described. The energy subtraction processing according to the first embodiment is divided into three stages of correction processing by the correction unit 132, signal processing by the signal processing unit 133, and image processing by the image processing unit 134. Each process will be described below.

(Explanation of Correction Processing)

The correction processing is processing of generating, by processing a plurality of radiation images obtained from the X-ray imaging apparatus 104, a plurality of images to be used for the signal processing (to be described later) in the energy subtraction processing. FIG. 5 shows the correction processing for the energy subtraction processing according to the embodiment. First, the obtaining unit 131 causes the X-ray imaging apparatus 104 to perform imaging in a state in which no X-rays are applied, thereby obtaining images by the driving operation shown in FIG. 3 or 4. With this driving operation, two images are read out. The first image (image 304 or 404) will be referred to as F_ODD hereinafter and the second image (image 306 or 406) will be referred to as F_EVEN hereinafter. Each of F_ODD and F_EVEN is an image corresponding to FPN (Fixed Pattern Noise) of the X-ray imaging apparatus 104.

Next, the obtaining unit 131 causes the X-ray imaging apparatus 104 to perform imaging by applying X-rays in a state in which there is no object, thereby obtaining gain correction images output from the X-ray imaging apparatus 104 by the driving operation shown in FIG. 3 or 4. With this driving operation, two images are read out, similar to the above operation. The first gain correction image (image 304 or 404) will be referred to as W_ODD hereinafter and the second gain correction image (image 306 or 406) will be referred to as W_EVEN hereinafter. Each of W_ODD and W_EVEN is an image corresponding to the sum of the FPN of the X-ray imaging apparatus 104 and the signal by X-rays. The correction unit 132 subtracts F_ODD from W_ODD and F_EVEN from W_EVEN, thereby obtaining images WF_ODD and WF_EVEN from each of which the FPN of the X-ray imaging apparatus 104 has been removed. This is called offset correction.

WF_ODD is an image corresponding to the X-rays 302 during the stable period, and WF_EVEN is an image corresponding to the sum of the X-rays 301 during the rising period, the X-rays 302 during the stable period, and the X-rays 303 during the falling period. Therefore, the correction unit 132 obtains an image corresponding to the sum of the X-rays 301 during the rising period and the X-rays 303 during the falling period by subtracting WF_ODD from WF_EVEN. The processing of obtaining an image corresponding to X-rays during a specific period delimited by the sample and hold operation by subtraction of a plurality of images is called color correction. The energy of the X-rays 301 during the rising period and that of the X-rays 303 during the falling period are lower than the energy of the X-rays 302 during the stable period. Therefore, by subtracting WF_ODD from WF_EVEN by color correction, a low energy image W_Low when there is no object is obtained. Furthermore, a high energy image W_High when there is no object is obtained from WF_ODD.

Next, the obtaining unit 131 causes the X-ray imaging apparatus 104 to perform imaging by applying X-rays in a state in which there is an object, thereby obtaining images output from the X-ray imaging apparatus 104 by the driving operation shown in FIG. 3 or 4. At this time, two images are read out. The first image (image 304 or 404) will be referred to as X_ODD hereinafter and the second image (image 306 or 406) will be referred to as X_EVEN hereinafter. The correction unit 132 performs the same offset correction processing and color correction processing as those when there is no object, thereby obtaining a low energy image X_Low when there is the object and a high energy image X_High when there is the object.

When d represents the thickness of the object, μ represents the linear attenuation coefficient of the object, $I_0$ represents the output of the pixel 20 when there is no object, and I represents the output of the pixel 20 when there is the object, equation (1) below holds.

$$I = I_0 \exp(-\mu d) \tag{1}$$

Equation (1) is modified to obtain equation (2) below. The right-hand side of equation (2) represents the attenuation rate of the object. The attenuation rate of the object is a real number between 0 and 1.

$$I/I_0 = \exp(-\mu d) \tag{2}$$

Therefore, the correction unit 132 obtains an attenuation rate image L at low energy by dividing the low energy image X_Low when there is the object by the low energy image W_Low when there is no object. Similarly, the correction unit 132 obtains an attenuation rate image H at high energy by dividing the high energy image X_High when there is the object by the high energy image W_High when there is no object. The processing of obtaining an attenuation rate image by dividing an image obtained based on a radiation image obtained when there is an object by an image obtained based on a radiation image obtained when there is no object is called gain correction. The correction processing by the correction unit 132 according to the first embodiment has been described above.

(Explanation of Signal Processing)

FIG. 6 is a block diagram of the signal processing of the energy subtraction processing according to this embodiment. The signal processing unit 133 generates a material characteristic image using a plurality of images obtained from the correction unit 132. Generation of a material decomposition image formed from a bone thickness image B and a soft tissue thickness image S will be described below. The signal processing unit 133 performs the following processing to obtain the bone thickness image B and the soft tissue thickness image S from the attenuation rate image L at low energy and the attenuation rate image H at high energy, both of which have been obtained by the correction processing shown in FIG. 5.

First, when E represents the energy of X-ray photons, N(E) represents the number of photons at the energy E, B represents a thickness in a bone thickness image, S represents a thickness in a soft tissue thickness image, $\mu_B(E)$ represents the linear attenuation coefficient of the bone at the energy E, $\mu_S(E)$ represents the linear attenuation coefficient of the soft tissue at the energy E, and $I/I_0$ represents the attenuation rate, equation (3) below holds.

$$I/I_0 = \frac{\int_0^\infty N(E)\exp\{-\mu_B(E)B - \mu_S(E)S\}EdE}{\int_0^\infty N(E)EdE} \tag{3}$$

The number N(E) of photons at the energy E is an X-ray spectrum. The X-ray spectrum is obtained by simulation or actual measurement. Each of the linear attenuation coefficient $\mu_B(E)$ of the bone at the energy E and the linear attenuation coefficient $\mu_S(E)$ of the soft tissue at the energy E is obtained from a database of NIST (National Institute of Standards and Technology) or the like. Therefore, according to equation (3), it is possible to calculate the attenuation rate $I/I_0$ for the arbitrary bone thickness B, soft tissue thickness S, and X-ray spectrum N(E).

When $N_L(E)$ represents a low energy X-ray spectrum and $N_H(E)$ represents a high energy X-ray spectrum, equations (4) below hold. Note that L represents a pixel value in the attenuation rate image at low energy and H represents a pixel value in the attenuation rate image at high energy.

$$L = \frac{\int_0^\infty N_L(E)\exp\{-\mu_B(E)B - \mu_S(E)S\}EdE}{\int_0^\infty N_L(E)EdE} \tag{4}$$

$$H = \frac{\int_0^\infty N_H(E)\exp\{-\mu_E(E)B - \mu_S(E)S\}EdE}{\int_0^\infty N_H(E)EdE}$$

By solving nonlinear simultaneous equations (4), the thickness B in the bone thickness image and the thickness S in the soft tissue thickness image are obtained. A case in which the Newton-Raphson method is used as a representative method of solving the nonlinear simultaneous equations will be explained. When m represents an iteration count of the Newton-Raphson method, $B^m$ represents a bone thickness after the mth iteration, and $S^m$ represents a soft tissue thickness after the mth iteration, an attenuation rate $H^m$ at high energy after the mth iteration and an attenuation rate $L^m$ at low energy after the mth iteration are given by:

$$L^m = \frac{\int_0^\infty N_L(E)\exp\{-\mu_B(E)B^m - \mu_S(E)S^m\}E\,dE}{\int_0^\infty N_L(E)E\,dE} \quad (5)$$

$$H^m = \frac{\int_0^\infty N_H(E)\exp\{-\mu_E(E)B^m - \mu_S(E)S^m\}E\,dE}{\int_0^\infty N_H(E)E\,dE}$$

The change rates of the attenuation rates when the thicknesses slightly change are given by:

$$\frac{\partial H^m}{\partial B^m} = \frac{\int_0^\infty -\mu_B(E)N_H(E)\exp\{-\mu_B(E)B^m - \mu_S(E)S^m\}E\,dE}{\int_0^\infty N_H(E)E\,dE} \quad (6)$$

$$\frac{\partial L^m}{\partial B^m} = \frac{\int_0^\infty -\mu_B(E)N_L(E)\exp\{-\mu_B(E)B^m - \mu_S(E)S^m\}E\,dE}{\int_0^\infty N_L(E)E\,dE}$$

$$\frac{\partial H^m}{\partial S^m} = \frac{\int_0^\infty -\mu_S(E)N_H(E)\exp\{-\mu_B(E)B^m - \mu_S(E)S^m\}E\,dE}{\int_0^\infty N_H(E)E\,dE}$$

$$\frac{\partial L^m}{\partial S^m} = \frac{\int_0^\infty -\mu_S(E)N_L(E)\exp\{-\mu_B(E)B^m - \mu_S(E)S^m\}E\,dE}{\int_0^\infty N_L(E)E\,dE}$$

At this time, using the attenuation rate H at high energy and the attenuation rate L at low energy, a bone thickness $B^{m+1}$ and a soft tissue thickness $S^{m+1}$ after the (m+1)th iteration are given by:

$$\begin{bmatrix} B^{m+1} \\ S^{m+1} \end{bmatrix} = \begin{bmatrix} B^m \\ S^m \end{bmatrix} + \begin{bmatrix} \dfrac{\partial H^m}{\partial B^m} & \dfrac{\partial H^m}{\partial S^m} \\ \dfrac{\partial L^m}{\partial B^m} & \dfrac{\partial L^m}{\partial S^m} \end{bmatrix}^{-1} \begin{bmatrix} H - H^m \\ L - L^m \end{bmatrix} \quad (7)$$

When det represents a determinant, the inverse matrix of a 2×2 matrix is given, using the Cramer's rule, by:

$$\det = \frac{\partial H^m}{\partial B^m}\frac{\partial L^m}{\partial S^m} - \frac{\partial H^m}{\partial S^m}\frac{\partial L^m}{\partial B^m} \quad (8)$$

$$\begin{bmatrix} \dfrac{\partial H^m}{\partial B^m} & \dfrac{\partial H^m}{\partial S^m} \\ \dfrac{\partial L^m}{\partial B^m} & \dfrac{\partial L^m}{\partial S^m} \end{bmatrix}^{-1} = \frac{1}{\det}\begin{bmatrix} \dfrac{\partial L^m}{\partial S^m} & -\dfrac{\partial H^m}{\partial S^m} \\ -\dfrac{\partial L^m}{\partial B^m} & \dfrac{\partial H^m}{\partial B^m} \end{bmatrix}$$

Therefore, by substituting equation (8) into equation (7), equations (9) below are obtained.

$$B^{m+1} = B^m + \frac{1}{\det}\frac{\partial L^m}{\partial S^m}(H - H^m) - \frac{1}{\det}\frac{\partial H^m}{\partial S^m}(L - L^m) \quad (9)$$

$$S^{m+1} = S^m - \frac{1}{\det}\frac{\partial L^m}{\partial B^m}(H - H^m) + \frac{1}{\det}\frac{\partial H^m}{\partial B^m}(L - L^m)$$

When the above calculation processing is repeated, the difference between the attenuation rate $H^m$ at high energy after the mth iteration and the actually measured attenuation rate H at high energy approaches almost 0. The same applies to the attenuation rate L at low energy. This causes the bone thickness $B^m$ after the mth iteration to converge to the bone thickness B, and causes the soft tissue thickness $S^m$ after the mth iteration to converge to the soft tissue thickness S. As described above, the nonlinear simultaneous equations (4) can be solved. Therefore, by calculating equations (4) for all the pixels, the bone thickness image B and the soft tissue thickness image S can be obtained from the attenuation rate image L at low energy and the attenuation rate image H at high energy.

Note that the bone thickness image B and the soft tissue thickness image S are calculated in the first embodiment but the present invention is not limited to this. For example, a water thickness W and a contrast agent thickness I may be calculated. That is, decomposition may be performed into the thicknesses of arbitrary two kinds of materials.

In this embodiment, the nonlinear simultaneous equations are solved using the Newton-Raphson method. However, the present invention is not limited to this. For example, an iterative method such as a least square method or a bisection method may be used. Furthermore, in the first embodiment, the nonlinear simultaneous equations are solved using the iterative method but the present invention is not limited to this. A configuration for generating a table by obtaining, in advance, the bone thicknesses B and the soft tissue thicknesses S for various combinations of the attenuation rates H at high energy and the attenuation rates L at low energy, and obtaining the bone thickness B and the soft tissue thickness S at high speed by referring to this table may be used.

FIG. 7 is a block diagram of the signal processing of the energy subtraction processing according to this embodiment. The signal processing unit 133 generates a material characteristic image using a plurality of images obtained from the correction unit 132. Generation of an image formed from an effective atomic number Z and a surface density D will be described below. By the following processing, the signal processing unit 133 obtains an image of the effective atomic number Z and an image of the surface density D from the attenuation rate image L at low energy and the attenuation rate image H at high energy, which are obtained by the correction processing shown in FIG. 5. The effective atomic number Z is an equivalent atomic number of a mixture, and the surface density D [g/cm$^2$] is the product of the density [g/cm$^3$] of an object and the thickness [cm] of the object.

First, when E represents the energy of X-ray photons, N(E) represents the number of photons at the energy E, Z represents the effective atomic number, D represents the surface density, μ(Z, E) represents a mass attenuation coefficient at the effective atomic number Z and the energy E, and I/L) represents the attenuation rate, equation (10) below holds.

$$I/I_0 = \frac{\int_0^\infty N(E)\exp\{-\mu(Z, E)D\}EdE}{\int_0^\infty N(E)EdE} \quad (10)$$

The number N(E) of photons at the energy E is an X-ray spectrum. The X-ray spectrum is obtained by simulation or actual measurement. The mass attenuation coefficient μ(Z, E) at the effective atomic number Z and the energy E is obtained from a database of NIST (National Institute of Standards and Technology) or the like. That is, it is possible to calculate the attenuation rate I/I$_0$ for the arbitrary effective atomic number Z, surface density D, and X-ray spectrum N(E).

When N$_L$(E) represents the low energy X-ray spectrum and N$_H$(E) represents the high energy X-ray spectrum, equations (11) below hold. Note that L represents a pixel value in the attenuation rate image at low energy and H represents a pixel value in the attenuation rate image at high energy.

$$L = \frac{\int_0^\infty N_L(E)\exp\{-\mu(Z, E)D\}EdE}{\int_0^\infty N_L(E)EdE} \quad (11)$$

$$H = \frac{\int_0^\infty N_H(E)\exp\{-\mu(Z, E)D\}EdE}{\int_0^\infty N_H(E)EdE}$$

By solving nonlinear simultaneous equations (11), the effective atomic number Z and the surface density D are obtained. A case in which the Newton-Raphson method is used as a representative method of solving the nonlinear simultaneous equations will be explained. When m represents the iteration count of the Newton-Raphson method, $Z^m$ represents an effective atomic number after the mth iteration, and $D^m$ represents a surface density after the mth iteration, the attenuation rate $H^m$ at high energy after the mth iteration and the attenuation rate $L^m$ at low energy after the mth iteration are given by:

$$L^m = \frac{\int_0^\infty N_L(E)\exp\{-\mu(Z^m, E)D^m\}EdE}{\int_0^\infty N_L(E)EdE} \quad (12)$$

$$H^m = \frac{\int_0^\infty N_H(E)\exp\{-\mu(Z^m, E)D^m\}EdE}{\int_0^\infty N_H(E)EdE}$$

The change rates of the attenuation rates when the thicknesses slightly change are given by equations (6) below. Also, the change rates of the attenuation rates when the effective atomic number and the surface density slightly change are given by:

$$\frac{\partial H^m}{\partial Z^m} = \frac{\int_0^\infty -\frac{\partial \mu(Z^m, E)}{\partial Z^m} D^m N_H(E)\exp\{-\mu(Z^m, E)D^m\}EdE}{\int_0^\infty N_H(E)EdE} \quad (13)$$

$$\frac{\partial L^m}{\partial Z^m} = \frac{\int_0^\infty -\frac{\partial \mu(Z^m, E)}{\partial Z^m} D^m N_L(E)\exp\{-\mu(Z^m, E)D^m\}EdE}{\int_0^\infty N_L(E)EdE}$$

$$\frac{\partial H^m}{\partial D^m} = \frac{\int_0^\infty -\mu(Z^m, E)N_H(E)\exp\{-\mu(Z^m, E)D^m\}EdE}{\int_0^\infty N_H(E)EdE}$$

$$\frac{\partial H^m}{\partial D^m} = \frac{\int_0^\infty -\mu(Z^m, E)N_L(E)\exp\{-\mu(Z^m, E)D^m\}EdE}{\int_0^\infty N_L(E)EdE}$$

At this time, using the attenuation rate H at high energy and the attenuation rate L at low energy, an effective atomic number $Z^{m+1}$ and a surface density $D^{m+1}$ after the (m+1)th iteration are given by:

$$\begin{bmatrix} Z^{m+1} \\ D^{m+1} \end{bmatrix} = \begin{bmatrix} Z^m \\ D^m \end{bmatrix} + \begin{bmatrix} \frac{\partial H^m}{\partial Z^m} & \frac{\partial H^m}{\partial D^m} \\ \frac{\partial L^m}{\partial Z^m} & \frac{\partial L^m}{\partial D^m} \end{bmatrix}^{-1} \begin{bmatrix} H - H^m \\ L - L^m \end{bmatrix} \quad (14)$$

When det represents a determinant, the inverse matrix of a 2×2 matrix is given, using the Cramer's rule, by:

$$det = \frac{\partial H^m}{\partial Z^m}\frac{\partial L^m}{\partial D^m} - \frac{\partial H^m}{\partial D^m}\frac{\partial L^m}{\partial Z^m} \quad (15)$$

$$\begin{bmatrix} \frac{\partial H^m}{\partial Z^m} & \frac{\partial H^m}{\partial D^m} \\ \frac{\partial L^m}{\partial Z^m} & \frac{\partial L^m}{\partial D^m} \end{bmatrix}^{-1} = \frac{1}{det}\begin{bmatrix} \frac{\partial L^m}{\partial D^m} & -\frac{\partial H^m}{\partial D^m} \\ -\frac{\partial L^m}{\partial Z^m} & \frac{\partial H^m}{\partial Z^m} \end{bmatrix}$$

Therefore, by substituting equation (15) into equation (14), equations (16) below are obtained.

$$Z^{m+1} = Z^m + \frac{1}{det}\frac{\partial L^m}{\partial D^m}(H - H^m) - \frac{1}{det}\frac{\partial H^m}{\partial D^m}(L - L^m) \quad (16)$$

$$D^{m+1} = D^m - \frac{1}{det}\frac{\partial L^m}{\partial Z^m}(H - H^m) + \frac{1}{det}\frac{\partial H^m}{\partial Z^m}(L - L^m)$$

When the above calculation processing is repeated, the difference between the attenuation rate $H^m$ at high energy after the mth iteration and the actually measured attenuation rate H at high energy approaches almost 0. The same applies to the attenuation rate L at low energy. This causes the effective atomic number $Z^m$ after the mth iteration to converge to the effective atomic number Z, and causes the surface density $D^m$ after the mth iteration to converge to the surface density D. As described above, the nonlinear simultaneous equations (11) can be solved.

In this embodiment, solving the nonlinear simultaneous equations using the Newton-Raphson method has been described. However, the present invention is not limited to this embodiment. For example, an iterative method such as a least square method or a bisection method may be used.

Furthermore, in this embodiment, the nonlinear simultaneous equations shown by equations (4) and (11) are solved using the iterative method. However, numerical integration needs to be performed in this process. In addition, recalculation needs to be done every time iterative calculation is performed m times. Furthermore, this operation is performed in all pixels. Therefore, signal processing of energy subtraction shown in FIG. 6 or 7 takes a long time. Particularly, since this embodiment assumes moving image capturing, the time permitted for the signal processing is 1 frame or less. For example, if the frame rate is 20 fps, processing does not catch up unless signal processing and image processing are performed at a speed of 50 ms or less. Therefore, a table may be generated by obtaining, in advance, the bone thicknesses B and the soft tissue thicknesses S for various combinations of the attenuation rates H at high energy and the attenuation rates L at low energy, and the bone thickness B and the soft tissue thickness S may be obtained at high speed by referring to this table.

Note that as for the table, the same applies not only to the bone thickness B and the soft tissue thickness S but also to the effective atomic number Z and the surface density D. For example, a table may be generated by obtaining, in advance, the effective atomic numbers Z and the surface densities D for various combinations of the attenuation rates H at high energy and the attenuation rates L at low energy, and the effective atomic number Z and the surface density D may be obtained at high speed by referring to this table.

FIG. 8 is a flowchart for explaining the procedure of table generation according to this embodiment. Let M be the table division count, l be the coordinate of low energy on the table, and h be the coordinate of high energy on the table. Note that the coordinates l and h on the table are integers. First, the imaging control apparatus 103 initializes the coordinate of low energy to l=0 (step S801), and initializes the coordinate of high energy to h=0 (step S802).

Next, the imaging control apparatus 103 obtains the attenuation rate L[l] at low energy at the coordinate l and the attenuation rate H[h] at high energy at the coordinate h by:

$$H[h]=h/M$$

$$L[l]=l/M \quad (17)$$

Concerning the thus obtained attenuation rate L[l] at low energy and the attenuation rate H[h] at high energy, the nonlinear simultaneous equations (4) are solved, thereby obtaining the bone thickness B and the soft tissue thickness S. The results are stored in a table B[l, h] for the bone thickness B and a table S[l, h] for the soft tissue thickness S (step S803). After that, the imaging control apparatus 103 sets h=h+1 (step S804). If the coordinate h of high energy does not exceed the table division count M (NO in step S805), the imaging control apparatus 103 repeats the processing from step S803. If the coordinate h of high energy exceeds the table division count M (YES in step S805), the imaging control apparatus 103 sets l=l+1 (step S806). If the coordinate l of low energy does not exceed the table division count M (NO in step S807), the imaging control apparatus 103 sets h=0 (step S802) and repeats the processing of steps S803 to S805. If the coordinate l of low energy exceeds the table division count M (YES in step S807), the table generation is ended. In the above-described way, the bone thicknesses B and the soft tissue thicknesses S can be obtained for all combinations of l and h and stored in the table.

Figure 9:
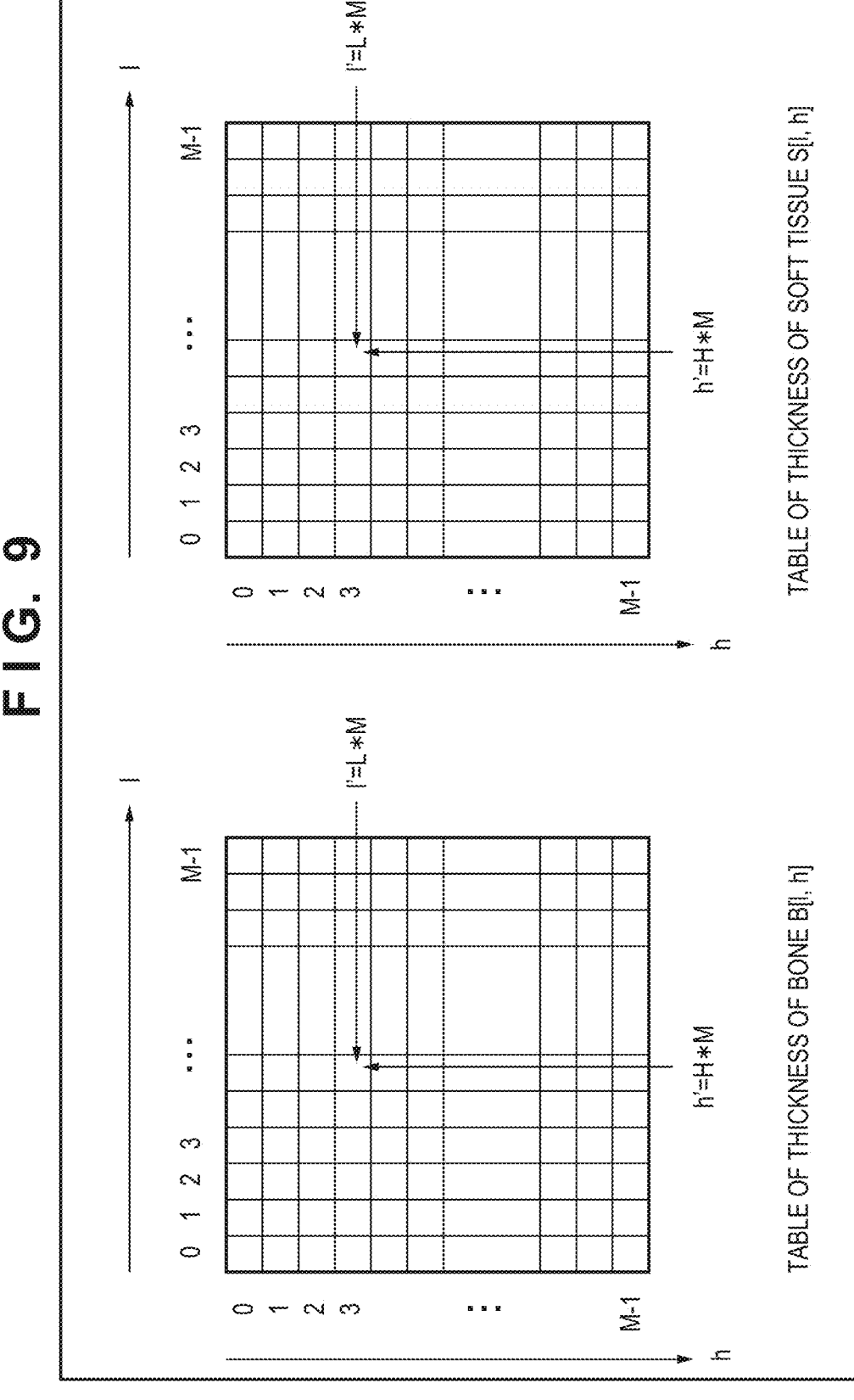
FIG. 9 is a schematic view of tables according to the embodiment.

FIG. 9 is a schematic view of the tables according to this embodiment. These tables are two-dimensional tables in which bone thicknesses and soft tissue thicknesses are registered in accordance with the combinations of attenuation rates indicated by high energy images and attenuation rates indicated by low energy images. Assume that the attenuation rate at low energy actually measured in a certain pixel is L, and the actually measured attenuation rate at high energy is H. At this time, the attenuation rates are converted into coordinates l' and h' on the tables by equations (18) below.

$$h'=H*M$$

$$l'=L*M \quad (18)$$

The table B[l, h] for the bone thickness B is referred to using the coordinates, thereby obtaining the bone thickness B. This also applies to the soft tissue thickness. The coordinates l' and h' on each table are decimals. However, unless the coordinates l' and h' are integers, the table cannot be referred to because it is stored in an array. Therefore, a configuration for converting the coordinates l' and h' into integers and then obtaining the bone thickness B and the soft tissue thickness S by interpolation is used. For example, letting l be a value obtained by rounding down the decimal places of the coordinate l' and h be a value obtained by rounding down the decimal places of the coordinate h', when obtaining the bone thickness B and the soft tissue thickness S by bilinear interpolation, equations (19) below can be used.

$$B = \{B[l, h](h + 1 - h') + B[l, h + 1](h' - h)\}(l + 1 - l') + \quad (19)$$

$$\{B[l + 1, h](h + 1 - h') + B[l + 1, h + 1](h' - h)\}(l' - l)$$

-continued $$S = \{S[l, h](h + 1 - h') + S[l, h + 1](h' - h)\}(l + 1 - l') +$$

$$\{S[l + 1, h](h + 1 - h') + S[l + 1, h + 1](h' - h)\}(l' - l)$$

Therefore, if the tables are generated in advance, the bone thickness B and the soft tissue thickness S can be obtained by calculation in an amount much smaller than in a case in which nonlinear simultaneous equations are solved. Such a table is effective unless the radiation spectrum N(E) changes. In general, since the radiation spectrum N(E) does not change during moving image capturing, generating the table once before imaging suffices. Generation and reference of tables shown in FIGS. 8 and 9 can similarly be used even in calculation for obtaining the thicknesses of two arbitrary materials, as a matter of course. These can similarly be used even in calculation for obtaining the effective atomic number Z and the surface density D. In this case, two-dimensional tables in which effective atomic numbers and surface densities are registered in accordance with the combinations of attenuation rates indicated by high energy images and attenuation rates indicated by low energy images are used. In this way, the signal processing of the energy subtraction shown in FIG. 6 or 7 can be performed accurately at a high speed.

Note that in this embodiment, the attenuation rate L[l] at low energy at the coordinate l and the attenuation rate H[h] at high energy at the coordinate h are obtained using equations (17). In the thus generated table, the coordinate along the ordinate represents the attenuation rate H at high energy, and the coordinate along the abscissa represents the attenuation rate L at low energy. In the table, the attenuation rates from 0 to 1 are divided at equal intervals. However, the attenuation rate for the composition and thickness of a human body often has a value close to 0. For this reason, if the table division count M is small, the error between a value obtained by referring to the table and performing interpolation and a value obtained by solving nonlinear simultaneous equations may become large. Therefore, if a constant for deciding the coordinate range is set to k (0<k), a configuration for obtaining the attenuation rate using equations (20) below can be used.

$$H[h] = \exp(-k * h/M)$$

$$L[l] = \exp(-k * l/M) \tag{20}$$

If the attenuation rates are obtained from the coordinates using equations (20), the coordinates can be obtained using equations (21) below.

$$h = -\ln(H[h]) * M/k$$

$$l = -\ln(L[l]) * M/k \tag{21}$$

Concerning referring to the tables and performing interpolation, equations (21) can be used. In the thus generated table, the coordinate along the ordinate is −ln(H), and the coordinate along the abscissa is −ln(L). Therefore, even if the value of the attenuation rate is close to 0, the error between a value obtained by referring to the table and performing interpolation and a value obtained by solving nonlinear simultaneous equations can be made small.

Also, in this embodiment, when generating and referring to the table, a combination of the attenuation rate H at high energy and the attenuation rate L at low energy, for which no solution exists, may occur. For example, the attenuation rate H at high energy is normally larger than the attenuation rate L at low energy. Therefore, in the tables generated using equations (17) or equations (20), a solution in a region where H<L cannot be obtained.

In this embodiment, the coordinates may be selected to reduce the region where no solution can be obtained on the table. For example, the coordinate along the ordinate may be set to ln(L)/ln(H), and the coordinate along the abscissa may be set to −ln(H). Alternatively, as the coordinate along the ordinate, a value solved by approximation using monochromatic radiation may be used. Also, when referring to the table in this embodiment, there may exist a possibility that a coordinate outside the range of the table is designated, or a possibility that a region where no solution can be obtained is referred to. In this case, a configuration for using a value in a region which is located around a designated coordinate and where a solution exists is used.

Figures 10, 11:
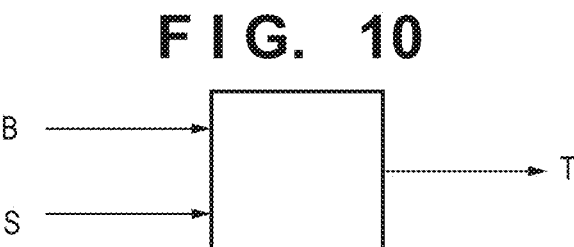
FIG. 10 is a block diagram of image processing according to the embodiment.
FIG. 11 is a flowchart for explaining the procedure of image processing according to the embodiment.

FIG. 10 is a block diagram of image processing of energy subtraction processing according to this embodiment. In the image processing according to this embodiment, for example, a configuration for performing tone processing for the bone image B or the soft tissue image S obtained by the signal processing shown in FIG. 6 and displaying the image is used. Since the soft tissue is removed from the bone image B, there is a possibility that the visibility of a medical device or calcification improves as compared to an image that has not undergone the energy subtraction processing.

A configuration for applying a time direction filter such as a recursive filter or a spatial direction filter such as a Gaussian filter to the bone image B or the soft tissue image S to reduce noise and then performing tone processing and displaying the image is also used. However, the embodiment is not limited to this. For example, a configuration for obtaining a total thickness image T from the bone image B and the soft tissue image S, as shown in FIG. 10, is preferably used.

In a human body, bones are surrounded by soft tissues. That is, the thickness of a soft tissue in a portion where a bone exists is less by an amount corresponding to the thickness of the bone. Therefore, when the soft tissue image S is displayed after tone processing, the contrast of the bone appears. On the other hand, if the soft tissue image S and the bone image B are added, the decrease in the thickness of the bone in the soft tissue image is canceled. That is, the thickness image T is an image without the contrast of the bone. Such an image is used in a situation where the contrast of the bone lowers the visibility of a contrast agent, like IVR of a lower limb. A configuration for applying a time direction filter such as a recursive filter or a spatial direction filter such as a Gaussian filter to the thickness image T to reduce noise and then performing tone processing and displaying the image may be used, as a matter of course. In addition, to use the k-absorption edge of the contrast agent, for example, a configuration for setting the tube voltage of low energy X-rays to 40 kV to 50 kV in the signal processing of the signal processing unit 133 is preferably used.

If radiation quality is selected such that the average energy of the spectrum of radiation used to obtain a radiation image based on low energy becomes lower than the k-absorption edge of the contrast agent, the contrast of the contrast agent in the thickness image T can be enhanced.

FIG. 11 is a flowchart for explaining the procedure of image processing according to this embodiment. First, the obtaining unit 131 performs imaging at the timing shown in FIG. 3 or 4 before injection of a contrast agent, and the correction unit 132 performs the correction shown in FIG. 5, thereby obtaining a high energy mask image $H^M$ and a low energy mask image $L^M$ (step S1101). Next, after the contrast agent is injected (step S1102), the obtaining unit 131 and the correction unit 132 similarly perform imaging and correction, thereby obtaining a high energy live image $H_L$ and a low energy live image $L_L$ (step S1103).

After that, the signal processing unit 133 performs the signal processing (energy subtraction (ES) processing) shown in FIG. 6 for the high energy mask image $H_M$ and the low energy mask image $L_M$, thereby decomposing these into a bone mask image $B_M$ and a soft tissue mask image $S_M$. Furthermore, the signal processing unit 133 performs similar processing for the high energy live image $H_L$ and the low energy live image $L_L$ as well, thereby decomposing these into a bone live image $B_L$ and a soft tissue live image $S_L$ (step S1104).

Finally, the image processing unit 134 obtains a bone DSA image $B_{DSA}$ by subtracting the bone mask image $B_M$ from the bone live image $B_L$, and obtains a soft tissue DSA image $S_{DSA}$ by subtracting the soft tissue mask image $S_M$ from the soft tissue live image $S_L$. By repetitively performing the live image capturing and the image processing, a moving image that combines energy subtraction and DSA is obtained. When the above-described processing is repetitively performed until an end of the processing is instructed (NO in step S1106), a moving image that combines energy subtraction and DSA can be obtained. If an end is instructed (YES in step S1106), the processing is ended.

FIG. 12 is a schematic view of image processing according to this embodiment. FIG. 12 shows how the DSA image $B_{DSA}$ is generated from the bone mask image $B_M$ and the bone live image $B_L$. The high energy mask image $H^M$ and the low energy mask image $L_M$ are images captured before injection of a contrast agent and therefore include only the information of bones and soft tissues. The bone mask image $B_M$ obtained by performing energy subtraction for these mask images includes the information of bones, and the soft tissue mask image $S_M$ (not shown) includes the information of soft tissues.

On the other hand, the high energy live image $H_L$ and the low energy live image $L_L$ are images captured after injection of a contrast agent and therefore include the information of bones, soft tissues, and the contrast agent. If energy subtraction is performed for these mask images, the information of the contrast agent that is the third material appears in the bone live image $B_L$. That is, the bone live image $B_L$ includes the information of bones and the contrast agent, and the soft tissue live image $S_L$ (not shown) includes the information of soft tissues.

If organs move between the mask image and the live image due to heart pulsation, breathing or the like, a large change appears in the soft tissue image. However, the positions of bones do not move largely. That is, the pieces of information of bones included in the bone live image $B_L$ and the bone mask image $B_M$ are almost the same. Therefore, in the bone DSA image $B_{DSA}$, the pieces of information of bones are canceled, and only the information of the contrast agent remains. In this way, even if there is a movement by heart pulsation, breathing, or the like, only the contrast agent can be imaged, and diagnosis of blood vessels can be made.

As described above, when the energy subtraction processing according to this embodiment is performed, a bone image without soft tissues, a thickness image without bones, and a contrast agent image without soft tissues and bones can be obtained. In any case, visibility is expected to improve because unnecessary structures are removed.

The present inventor further made examinations and found that in some cases, soft tissues cannot completely be removed from the bone image that has undergone the signal processing shown in FIG. 6. It is also found that in some cases, bones cannot completely be removed from the thickness image that has undergone the image processing shown in FIG. 10, or soft tissues cannot completely be removed from the contrast agent image that has undergone the image processing shown in FIG. 12. If an unnecessary structure cannot completely be removed, that is, if an erase residue exists, visibility lowers.

The present inventor made examinations and found that if an error occurs in the attenuation rate $I/I_0$ on the left-hand side of equation (3) due to scattered rays or nonlinearity of the pixel 20, an erase residue may occur. It is also found that if the low energy X-ray spectrum $N_L(E)$ and the high energy X-ray spectrum $N_H(E)$ on the right-hand sides of equations (4) are different from actual spectra, an erase residue may occur.

Similarly, if the linear attenuation coefficient $\mu_H(E)$ of bone and the linear attenuation coefficient $\mu_S(E)$ of soft tissue are different from actual linear attenuation coefficients, an erase residue may occur. For the sake of simplicity of the description, assume that scattered rays, the nonlinearity of the pixel 20, and the error of spectra are already removed or corrected. In this embodiment, a method of reducing errors of the linear attenuation coefficients is proposed.

FIG. 13 is a view showing the relationship between an actual water thickness and a calculated bone thickness. Here, water is set as the component of an object. When the obtaining unit 131 performs imaging at the timing shown in FIG. 3 or 4, the correction unit 132 performs the correction shown in FIG. 5, and the signal processing unit 133 performs the signal processing shown in FIG. 6, the bone image B and the soft tissue image S are obtained. Since the object includes only water as its component, the output of the bone image B, that is, the bone thickness is preferably zero. In a case in which the linear attenuation coefficient of water is used as the linear attenuation coefficient $\mu_S(E)$ of the soft tissue to be input to equations (4), even if the actual water thickness changes, the calculated bone thickness does not change, as indicated by a broken line 1301 in FIG. 13. On the other hand, in a case in which the linear attenuation coefficient of fat is used as the linear attenuation coefficient $\mu_S(E)$ of the soft tissue, if the actual water thickness changes, the calculated bone thickness changes, as indicated by a solid line 1302 in FIG. 13. FIG. 14 is a schematic view of image processing according to the embodiment. A bone image 1401 shows a case in which the linear attenuation coefficient of fat is used as a soft tissue, and a bone image 1402 shows a case in which the linear attenuation coefficient of water is used as a soft tissue. In this case, as shown in the schematic view of image processing according to the embodiment in FIG. 14, in the bone image 1401, the change of the thickness of the soft tissue appears in the bone image, and an erase residue occurs.

As described above, the present inventor found that if the actual linear attenuation coefficient of the soft tissue and the linear attenuation coefficient input to the signal processing shown in FIG. 6 are different, an erase residue occurs. Also, the present inventor found that if the actual linear attenuation coefficient of the soft tissue is estimated and input to the signal processing shown in FIG. 6, the erase residue can be reduced. As the method of estimating the linear attenuation coefficient, the effective atomic number is preferably used. As described concerning the signal processing shown in FIG. 7, the effective atomic number Z is an equivalent atomic number of a mixture, and the surface density D [g/cm$^2$] is the product of the density [g/cm$^3$] of an object and the thickness [cm] of the object. That is, the effective atomic number is a parameter independent of the thickness. The effective atomic number of water is 7.42, that of fat is 6.33, that of a bone is 13.18, and that of acryl is 6.47. The present inventor measured a tissue piece of an organism and found that the effective atomic number changes depending on the organ. That is, it can be said that the actual linear attenuation coefficient of the soft tissue changes depending on the imaging part. Therefore, a configuration for measuring the effective atomic number of the soft tissue during imaging and estimating the linear attenuation coefficient is preferably used.

Figure 15:
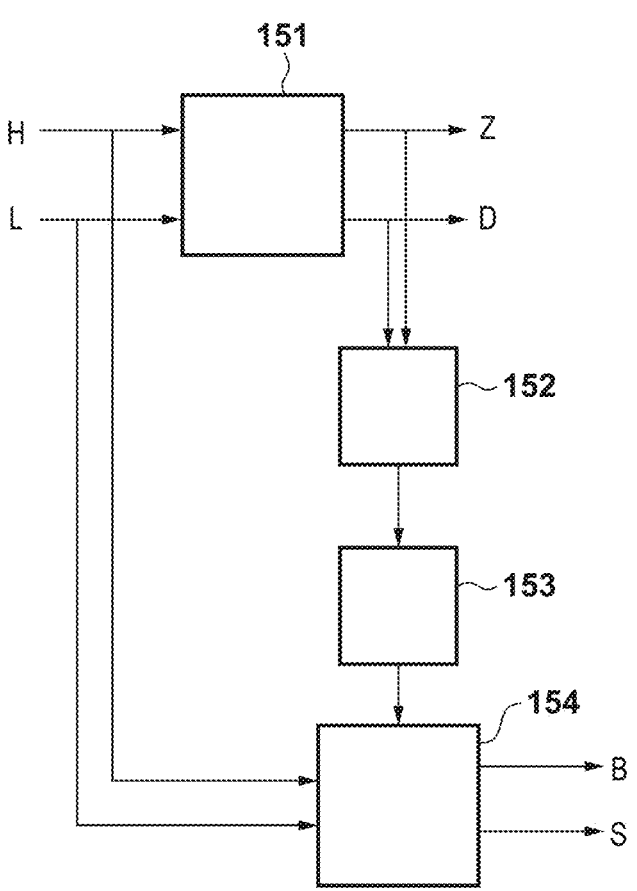
FIG. 15 is a block diagram of signal processing according to the embodiment.

FIG. 15 is a block diagram of signal processing of energy subtraction processing according to this embodiment. The signal processing unit 133 generates the image of the effective atomic number Z and the image of the surface density D by energy subtraction processing using a plurality of attenuation rate images (H, L). First, in a signal processing block 151, the signal processing unit 133 performs the signal processing shown in FIG. 7 for the attenuation rate image H at high energy and the attenuation rate image L at low energy, which are obtained by the correction processing shown in FIG. 5, thereby obtaining the image of the effective atomic number Z and the image of the surface density D.

The signal processing unit 133 estimates the attenuation information of the first material (for example, the soft tissue) from the pixel values of the image of the effective atomic number. In a signal processing block 152, the signal processing unit 133 averages the pixel values of a plurality of pixels of the image of the effective atomic number Z obtained in the signal processing block 151, thereby estimating an effective atomic number $Z_S$ of the soft tissue. Next, in a signal processing block 153, the signal processing unit 133 estimates the linear attenuation coefficient $\mu_S(E)$ of the soft tissue based on the effective atomic number $Z_S$ of the soft tissue estimated in the signal processing block 152.

The signal processing unit 133 performs energy subtraction processing using the plurality of attenuation rate images (H, L) and the attenuation information, thereby generating images decomposed into the image of the thickness of the first material and the image of the thickness of the second material.

Here, the signal processing unit 133 estimates, as the attenuation information, the linear attenuation coefficient of the first material at the energy of radiation, and performs energy subtraction processing using the plurality of attenuation rate images (H, L) and the attenuation information (the linear attenuation coefficient of the first material), thereby generating images decomposed into the image of the thickness of the first material (soft tissue image S) and the image of the thickness of the second material (bone image B).

That is, in a signal processing block 154, the signal processing unit 133 performs the signal processing shown in FIG. 6 using the linear attenuation coefficient $\mu_S(E)$ of the soft tissue estimated in the signal processing block 153, thereby obtaining the bone image B and the soft tissue image S.

When such signal processing is performed, the error between the actual linear attenuation coefficient of the soft tissue and the linear attenuation coefficient $\mu_S(E)$ of the soft tissue input to the signal processing becomes small, and the erase residue of the soft tissue in the bone image can be reduced.

Also, the signal processing unit 133 estimates, as the attenuation information, the mass attenuation coefficient of the first material at the energy of radiation, and performs energy subtraction processing using the plurality of attenuation rate images (H, L) and the attenuation information (the mass attenuation coefficient of the first material), thereby generating the image of the surface density of the first material and the image of the surface density of the second material.

An example in which in the signal processing block 151 shown in FIG. 15, the signal processing shown in FIG. 7 is performed to obtain the image of the effective atomic number Z and the image of the surface density D has been described. However, the embodiment is not limited to this. For example, a configuration for generating the tables of the effective atomic number and the surface density by the method shown in FIG. 8 and performing the same signal processing as in FIG. 7 at a high speed by referring to the tables by the method shown in FIG. 9 can also be used.

Also, in the signal processing block 152 shown in FIG. 15, the signal processing unit 133 averages the pixel values of a plurality of pixels of the image of the effective atomic number Z obtained in the signal processing block 151, thereby estimating the effective atomic number $Z_S$ of the soft tissue. In the signal processing block 153, the signal processing unit 133 estimates the attenuation information of the first material (the linear attenuation coefficient $\mu_S(E)$ of the soft tissue) based on the effective atomic number $Z_S$ of the soft tissue estimated in the signal processing block 152. Then, the signal processing unit 133 performs energy subtraction processing using the plurality of attenuation rate images (H, L) and the estimated attenuation information of the first material, thereby generating images decomposed into the image of the first material and the image of the second material.

Here, as a detailed example of the pixel values of a plurality of pixels, a configuration for averaging the pixel values of all pixels of the effective atomic number image Z can be considered. However, the embodiment is not limited to this. For example, if the pixel value of a pixel in a region where a bone exists is included in the averaging calculation, the estimation accuracy of the effective atomic number $Z_S$ of the first material (for example, the soft tissue) may lower. For this reason, the signal processing unit 133 can determine a pixel whose effective atomic number exceeds a predetermined threshold (the threshold of the effective atomic number) as a pixel in a region where the second material (for example, the bone) exists in the effective atomic number image Z, and perform processing such that the pixel value determined as a pixel in the region where the second material exists is not included in the averaging calculation.

Also, if the pixel value of a pixel in a region where the object does not exist is included in the averaging calculation, the estimation accuracy of the effective atomic number $Z_S$ of the first material (for example, the soft tissue) may undesirably lower. For this reason, the signal processing unit 133 can determine a pixel whose surface density falls below a predetermined threshold (the threshold of the surface density (surface density threshold) as a pixel in a region where the object does not exist, and perform processing such that the pixel value determined as a pixel in the region where the object does not exist is not included in the averaging calculation.

Furthermore, if the imaging range is wide, different organs exist, and the effective atomic number $Z_S$ of the soft tissue may undesirably change for each region in the screen. For this reason, the signal processing unit 133 can divide the effective atomic number image (entire screen) into a plurality of regions and average the pixel values of the effective atomic number image for each divided region, thereby estimating the effective atomic number $Z_S$ of the first material (for example, the soft tissue) in each region. The signal processing unit 133 can also estimate the attenuation information (for example, the linear attenuation coefficient $\mu_S(E)$) of the first material based on the estimated effective atomic number $Z_S$ of the first material.

In this case, when averaging the pixel values of the effective atomic number image Z for each divided region, processing can be performed such that values in the region where the bone exists and the region where the object does not exist are not included in the averaging calculation.

In the signal processing block 153 shown in FIG. 15, the signal processing unit 133 obtains the linear attenuation coefficient $\mu_S(E)$ of the soft tissue based on the effective atomic number $Z_S$ of the soft tissue estimated in the signal processing block 152. For example, assume that the soft tissue is a mixture of water and fat, and let $Z_W$ be the effective atomic number of water, $D_W$ be the surface density of water, $Z_A$ be the effective atomic number of fat, and $D_A$ be the surface density of fat. A surface density $D_S$ and the effective atomic number $Z_S$ of the soft tissue are given by:

$$D_S = D_W + D_A$$

$$Z_S^{2.94} * D_S = Z_W^{2.94} * D_W + Z_A^{2.94} * D_A \tag{22}$$

Also, letting $\rho_w$ be the density of water, and $\rho_A$ be the density of fat, a ratio $\alpha$ of water contained in the soft tissue is given by:

$$\alpha = (D_W/\rho_W)/(D_W/\rho_W + D_A/\rho_A) \tag{23}$$

Equations (24) below are derived from equations (22) and (23).

$$D_W = (Z_S^{2.94} - Z_A^{2.94}) * D_S/(Z_W^{2.94} - Z_A^{2.94})$$

$$D_A = (Z_W^{2.94} - Z_S^{2.94}) * D_S/(Z_W^{2.94} - Z_A^{2.94})$$

$$\alpha = \{(Z_S^{2.94} - Z_A^{2.94})/\rho_W\}/\{(Z_S^{2.94} - Z_A^{2.94})/\rho_W + (Z_W^{2.94} - Z_S^{2.94})/\rho_A\} \tag{24}$$

The water density pw and the fat density $\rho_A$ are obtained from a database of NIST or the like. To increase the accuracy, a configuration using the actually measured water density pw and fat density $\rho_A$ is preferably used.

Note that if the water density $\rho_W$ and the fat density $\rho_A$ are approximated to be equal, the water ratio $\alpha$ is given by:

$$\alpha - (Z_S^{2.94} - Z_A^{2.94})/(Z_W^{2.94} - Z_A^{2.94}) \tag{25}$$

Thus, the linear attenuation coefficient $\mu_S(E)$ of the soft tissue is given by equations (26) below. Here, $\mu_W(E)$ is the linear attenuation coefficient of water, and $\mu_A(E)$ is the linear attenuation coefficient of fat. For example, if the soft tissue is assumed to be a mixture of water and fat, in the upper equation of equations (26), the soft tissue on the left-hand side is represented by the sum of the relational expressions of water and fat on the right-hand side. The lower equation of equations (26) expresses the linear attenuation coefficient $\mu_S(E)$ of the soft tissue using the water ratio $\alpha$ of equation (23), the linear attenuation coefficient $\mu_W(E)$ of water, and the linear attenuation coefficient $\mu_A(E)$ of fat.

$$\mu_S(E)(D_W/\rho_W + D_A/\rho_A) = \mu_W(E)D_W/\rho_W + \mu_A(E)D_A/\rho_A \mu_S$$
$$(E) = \alpha\mu_W(E) + (1-\alpha)\mu_A(E) \tag{26}$$

As the linear attenuation coefficient $\mu_W(E)$ of water and the linear attenuation coefficient $\mu_A(E)$ of fat in equations (26), values obtained from a database of NIST or the like are used. However, to further increase the accuracy, actually measured linear attenuation coefficients may be used. The signal processing unit 133 estimates, as the attenuation information, the linear attenuation coefficient of the first material (for example, the soft tissue) at the energy of radiation. Here, the signal processing unit 133 estimates the linear attenuation coefficient of the first material using the linear attenuation coefficient of the third material (for example, water), the density of the third material, the linear attenuation coefficient of the fourth material (for example, fat), and the density of the fourth material. The signal processing unit 133 can estimate the linear attenuation coefficient of the first material (for example, the soft tissue) using actually measured values as the linear attenuation coefficient of the third material and the linear attenuation coefficient of the fourth material or the density of the third material and the density of the fourth material.

An example in which in the signal processing block 154 shown in FIG. 15, the signal processing unit 133 performs the signal processing shown in FIG. 6 using the linear attenuation coefficient $\mu_S(E)$ of the soft tissue estimated in the signal processing block 153 to obtain the bone image B and the soft tissue image S has been described. However, the embodiment is not limited to this. For example, a configuration for generating the tables of the thickness of the soft tissue and the thickness of the bone by the method shown in FIG. 8 and performing the same signal processing as in FIG. 6 at a high speed by referring to the tables by the method shown in FIG. 9 can also be used.

However, if the ratio $\alpha$ of water contained in the soft tissue changes, the linear attenuation coefficient $\mu_S(E)$ of the soft tissue also changes. For this reason, the tables of the soft tissue thickness and the bone thickness undesirably need to be regenerated.

Figure 16:
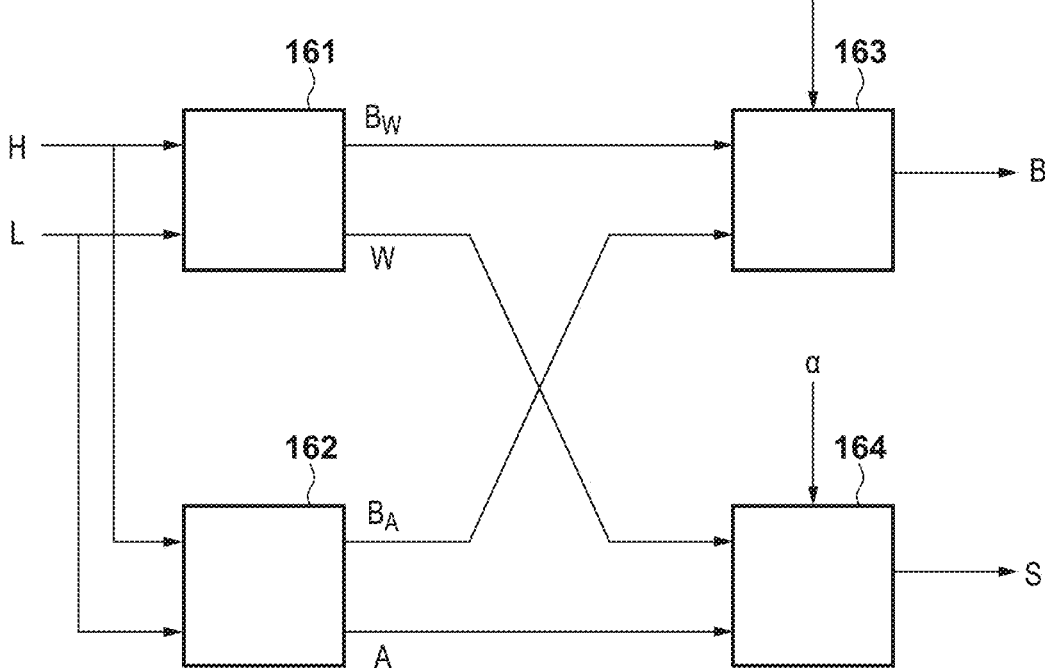
FIG. 16 is a block diagram of signal processing.

FIG. 16 is a block diagram of signal processing of energy subtraction processing according to this embodiment. First, a table of a water thickness (W) and a bone thickness $(B_W)$ and a table of a fat thickness (A) and a bone thickness $(B_A)$ are generated by the method shown in FIG. 8. The signal processing unit 133 generates a first table in which the thickness of the second material (for example, the thickness $(B_W)$ of the bone) and the thickness of the third material (for example, the thickness (W) of water) are registered in accordance with a combination of a plurality of attenuation rates, and a second table in which the thickness of the second material (for example, the thickness $(B_A)$ of the bone) and the thickness of the fourth material (for example, the thickness (W) of fat) are registered in accordance with a combination of a plurality of attenuation rates.

In a signal processing block 161, the signal processing unit 133 obtains the water thickness W and the bone thickness $B_W$ using the table of the water thickness and the bone thickness.

In a signal processing block 162, the signal processing unit 133 obtains the fat thickness A and the bone thickness $B_A$ using the table of the fat thickness and the bone thickness.

Next, in a signal processing block 163, the signal processing unit 133 obtains the bone thickness B using the bone thickness $B_W$ obtained by the processing of the signal processing block 161, the bone thickness $B_A$ obtained by the processing of the signal processing block 162, and the ratio $\alpha$ of water contained in the soft tissue. That is, the signal processing unit 133 obtains the thickness image (bone thickness B) of the second material based on the thickness (bone thickness $B_W$) of the second material obtained using the first table used in the signal processing block 161, the thickness (bone thickness $B_A$) of the second material obtained using the second table used in the signal processing block 162, and ratio information (water ratio $\alpha$).

Finally, in a signal processing block 164, the signal processing unit 133 obtains the soft tissue thickness S using the water thickness W obtained by the processing of the signal processing block 161, the fat thickness A obtained by the processing of the signal processing block 162, and the ratio α of water contained in the soft tissue. That is, the signal processing unit 133 obtains the thickness image (soft tissue thickness S) of the first material based on the thickness (water thickness (W)) of the third material obtained using the first table used in the signal processing block 161, the thickness (fat thickness (A)) of the fourth material obtained using the second table used in the signal processing block 162, and ratio information (water ratio α). As the method of obtaining the bone thickness B in the signal processing block 163 and the method of obtaining the soft tissue thickness S in the signal processing block 164, equations (27) are used.

$$B=\alpha B_W+(1-\alpha)B_A$$

$$S=\alpha W+(1-\alpha)A \qquad (27)$$

In the above-described way, even if the ratio α of water contained in the soft tissue changes, the bone image B and the soft tissue image S can be obtained without regenerating the tables.

In the description of FIG. 16, the table of the water thickness (W) and the bone thickness ($B_W$) and the table of the fat thickness (A) and the bone thickness ($B_A$) are used. However, the embodiment is not limited to this. For example, tables may be generated using materials other than water and fat. Alternatively, two or more tables may be created by changing the ratios of water and fat, and the bone thickness B and the soft tissue thickness S may be obtained from the two or more tables and the ratio α of water contained in the soft tissue. Alternatively, the soft tissue of the object may be formed by a material other that the mixture of water and fat.

FIG. 17 is a view showing the relationship between an actual muscle thickness and a calculated bone thickness. Here, muscle is set as the component of an object. When the obtaining unit 131 performs imaging at the timing shown in FIG. 3 or 4, the correction unit 132 performs the correction shown in FIG. 5, and the signal processing unit 133 performs the signal processing shown in FIG. 6, the bone image B and the soft tissue image S are obtained. Since the object includes only muscle as its component, the output of the bone image B, that is, the bone thickness is preferably zero. In a case in which the linear attenuation coefficient of fat is used as the linear attenuation coefficient $\mu_S(E)$ of the soft tissue to be input to equations (4), if the actual muscle thickness changes, the calculated bone thickness changes, as indicated by a solid line 1701 in FIG. 17. Also, even in a case in which the linear attenuation coefficient of water is used as the linear attenuation coefficient $\mu_S(E)$ of the soft tissue, if the actual muscle thickness changes, the calculated bone thickness changes, as indicated by an alternate long and short dashed line 1702 in FIG. 17. This is because the effective atomic number of muscle is 7.45 and is larger than the effective atomic number of water, 7.42. If the ratio α of water contained in the soft tissue is calculated in this situation using the method shown in FIG. 16, α>1, and the ratio of fat contained in the soft tissue is (1−α)<0. This ratio is physically impossible.

However, the present inventor made examinations and found that a linear attenuation coefficient calculated from the ratio α (α>1) of water contained in the soft tissue can be used as the linear attenuation coefficient $\mu_S(E)$ of the soft tissue to be input to equations (4). It is also found that in a case in which such a linear attenuation coefficient is used, even if the actual muscle thickness changes, the calculated bone thickness does not change, as indicated by a broken line 1703 in FIG. 17. That is, it is found that even if the effective atomic number of the soft tissue is equal to or larger than that of water or equal to or smaller than that of fat, erase residues can be reduced by estimating the ratio α of water contained in the soft tissue. In short, the ratio α of water contained in the soft tissue or the ratio (1−α) of fat contained in the soft tissue may be 1 or more or 0 or less. Even if generation of tables or calculation of the ratio α is performed using the linear attenuation coefficients of material 1 and material 2, which are materials other than water and fat as the materials contained in the soft tissue of the object, the ratio α of material 1 or the ratio (1−α) of material 2 may be 1 or more or 0 or less.

Also, in the signal processing block 154 described with reference to FIG. 15, the erase residues of unnecessary structures in a bone image without soft tissues, a thickness image without bones, and a contrast agent image without soft tissues and bones are reduced using the estimated linear attenuation coefficient $\mu_S(E)$ of the soft tissue.

However, the embodiment is not limited to this. For example, if a linear attenuation coefficient (the unit is 1/cm) is used in the signal processing block 154, the unit of the output image is cm, that is, length. However, a mass attenuation coefficient (the unit is $cm^2/g$) may be used. If the mass attenuation coefficient is used, a configuration for dividing the linear attenuation coefficient by a density is preferably used. In this case, the unit of an output image is $g/cm^2$, that is, surface density.

Additionally, in the signal processing block 154 according to this embodiment, the soft tissue image S and the bone image B are output. However, the embodiment is not limited to this. The images of two arbitrary materials may be output. As described above, in this embodiment, it is possible to estimate the attenuation coefficient of the first material from a plurality of images of different energies and generate the image of material 1 or the image of material 2 using the estimated attenuation coefficient of the first material and a predetermined attenuation coefficient of the second material.

Second Embodiment

In the first embodiment, the erase residues of unnecessary structures are reduced by estimating the linear attenuation coefficient of a soft tissue. At this time, the linear attenuation coefficient of the soft tissue is estimated from the effective atomic number of the soft tissue calculated using the signal processing shown in FIG. 7. On the other hand, in the second embodiment, a configuration for estimating the linear attenuation coefficient of a soft tissue from the thickness of water and the thickness of fat calculated using signal processing shown in FIG. 6 will be described.

FIG. 18 is a block diagram of signal processing according to the second embodiment. A signal processing unit 133 performs energy subtraction processing using a plurality of attenuation rate images (H, L), thereby generating images decomposed into the image of the thickness of a third material (for example, water contained in a soft tissue) and the image of the thickness of a fourth material (for example, fat contained in the soft tissue), which are contained in a first material (for example, the soft tissue). First, in a signal processing block 181, the signal processing unit 133 performs the signal processing shown in FIG. 6 for an attenuation rate image H at high energy and an attenuation rate image L at low energy, which are obtained by the correction processing shown in FIG. 5. The image of the thickness of the third material (water image W) and the image of the thickness of the fourth material (fat image A) are obtained using not a linear attenuation coefficient $\mu_B(E)$ of a bone and a linear attenuation coefficient $\mu_S(E)$ of a soft tissue but a linear attenuation coefficient $\mu_W(E)$ of water and a linear attenuation coefficient $\mu_A(E)$ of fat.

The signal processing unit 133 estimates the attenuation information of the first material from the ratio information of the third material contained in the first material obtained from the image of the thickness of the third material and the image of the thickness of the fourth material. First, in a signal processing block 182, the signal processing unit 133 estimates the ratio information (water ratio α) of the third material contained in the first material (for example, the soft tissue) from the image of the thickness of the third material (water image W) and the image of the thickness of the fourth material (fat image A) obtained in the signal processing block 181.

Next, in a signal processing block 183, the signal processing unit 133 estimates the attenuation information (for example, the linear attenuation coefficient $\mu_S(E)$) of the first material from the ratio information (water ratio α) of the third material contained in the first material (for example, the soft tissue), which is estimated in the signal processing block 182.

The signal processing unit 133 performs energy subtraction processing using the plurality of attenuation rate images (H, L) and the attenuation information of the first material, thereby generating images decomposed into the image of the first material and the image of the second material.

Here, the signal processing unit 133 estimates, as the attenuation information, the linear attenuation coefficient of the first material at the energy of radiation, and performs energy subtraction processing using the plurality of attenuation rate images (H, L) and the attenuation information (the linear attenuation coefficient of the first material), thereby generating images decomposed into the image of the thickness of the first material (soft tissue image S) and the image of the thickness of the second material (bone image B).

That is, in a signal processing block 184, the signal processing unit 133 performs the signal processing shown in FIG. 6 using the linear attenuation coefficient $\mu_S(E)$ of the soft tissue estimated in the signal processing block 183, thereby obtaining the bone image B and the soft tissue image S.

When such signal processing is performed, the error between the actual linear attenuation coefficient of the soft tissue and the linear attenuation coefficient $\mu_S(E)$ of the soft tissue input to the signal processing becomes small, and the erase residue of the soft tissue in the bone image can be reduced.

Also, the signal processing unit 133 estimates, as the attenuation information, the mass attenuation coefficient of the first material at the energy of radiation, and performs energy subtraction processing using the plurality of attenuation rate images (H, L) and the attenuation information (the mass attenuation coefficient of the first material), thereby generating the image of the surface density of the first material (for example, the soft tissue) and the image of the surface density of the second material (for example, the bone).

An example in which in the signal processing block 181 shown in FIG. 18, the signal processing shown in FIG. 6 is performed using the linear attenuation coefficient $\mu_W(E)$ of water and the linear attenuation coefficient $\mu_A(E)$ of fat to obtain the water image W and the fat image A has been described. However, the embodiment is not limited to this.

For example, a configuration for generating the tables of water and fat by the method shown in FIG. 8 and performing the same signal processing as in FIG. 6 at a high speed by referring to the tables by the method shown in FIG. 9 can also be used.

Also, the signal processing unit 133 estimates the attenuation information of the first material (for example, the linear attenuation coefficient $\mu_S(E)$ of the soft tissue) from ratio information (for example, the ratio α of the third material contained in the first material=W/(W+A)) obtained by averaging the pixel values of a plurality of pixels in the image of the thickness of the third material (for example, the water image W) and the image of the thickness of the fourth material (for example, the fat image A).

In the signal processing block 182 shown in FIG. 18, the signal processing unit 133 calculates the water ratio α (W/(W+A)) for each pixel from the water image W and the fat image A obtained in the signal processing block 181. Also, the signal processing unit 133 estimates the ratio α of water contained in the soft tissue by averaging the water ratios W/(W+A) in the pixel values of a plurality of pixels.

As a detailed example of the plurality of pixels, a configuration for averaging the pixel values of all pixels can be considered. However, the embodiment is not limited to this. For example, if the pixel value of a pixel in a region where a bone exists is included in the averaging calculation, the estimation accuracy of the ratio α of water contained in the soft tissue may undesirably lower.

For this reason, the signal processing unit 133 determines a pixel whose ratio information (the ratio α of the third material contained in the first material) exceeds a ratio threshold as a pixel in a region where the second material (for example, the bone) exists in the image of the thickness of the third material (for example, the water image W) and the image of the thickness of the fourth material (for example, the fat image A), and performs processing such that the pixel value determined as a pixel in the region is not included in the averaging calculation. That is, the signal processing unit 133 can determine a pixel whose water ratio W/(W+A) exceeds a predetermined threshold (water ratio threshold) as a pixel in a region where the bone exists, and perform processing such that the pixel value of the pixel determined as a pixel in the region where the bone exists is not included in the averaging calculation.

Also, if the pixel value of a pixel in a region where the object does not exist is included in the averaging calculation, the ratio α of water contained in the soft tissue may undesirably lower. For this reason, the signal processing unit 133 determines a pixel for which the total thickness of the third material (for example, water) and the fourth material (for example, fat) falls below a thickness threshold as a pixel in a region where the object does not exist, and performs processing such that the pixel value determined as a pixel in the region is not included in the averaging calculation. That is, the signal processing unit 133 can determine a pixel for which the total thickness (W+A) of the thickness of water in the water image W and the thickness of fat in the fat image A falls below a predetermined threshold (thickness threshold) as a pixel in a region where the object does not exist, and perform processing such that the pixel value determined as a pixel in the region where the object does not exist is not included in the averaging calculation.

Furthermore, if the imaging range is wide, different organs exist, and the ratio α of water contained in the soft tissue may undesirably change for each region in the screen. For this reason, the signal processing unit 133 divides each of the image of the thickness of the third material (for example, the water image W) and the image of the thickness of the fourth material (for example, the fat image A) into a plurality of regions and averages the ratio information (the ratio $\alpha$ of the third material contained in the first material) for each region, thereby estimating the attenuation information of the first material (for example, the linear attenuation coefficient $\mu_S(E)$ of the soft tissue) in each region.

That is, the signal processing unit 133 can divide the images (entire screen) into a plurality of regions and average the water ratios W/(W+A) for each region, thereby estimating the ratio $\alpha$ of water included in the soft tissue in each region. In this case, when averaging the water ratios W/(W+A) for each divided region, processing can be performed such that values in the region where the bone exists and the region where the object does not exist are not included in the averaging calculation.

In the signal processing block 183 shown in FIG. 18, the signal processing unit 133 obtains the linear attenuation coefficient $\mu_S(E)$ of the soft tissue based on the ratio $\alpha$ of water contained in the soft tissue, which is estimated in the signal processing block 182. At this time, like the signal processing block 153 shown in FIG. 15, the signal processing unit 133 can obtain the linear attenuation coefficient $\mu_S(E)$ of the soft tissue using equations (26). As the linear attenuation coefficient $\mu_W(E)$ of water and the linear attenuation coefficient $\mu_A(E)$ of fat in equations (26), values obtained from a database of NIST or the like are used. However, to further increase the accuracy, as actually measured linear attenuation coefficients, the actually measured value of the linear attenuation coefficient of the third material (for example, water) and the actually measured value of the linear attenuation coefficient of the fourth material (for example, fat) may be used. The linear attenuation coefficients obtained from the database can also be corrected using the actually measured density of the third material (for example, the water density $\rho_W$) and the fourth material (for example, the fat density $\rho_A$).

In the signal processing block 184 shown in FIG. 18, like the signal processing block 154 shown in FIG. 15, the signal processing unit 133 performs the signal processing shown in FIG. 6 using the linear attenuation coefficient $\mu_S(E)$ of the soft tissue estimated in the signal processing block 183, thereby obtaining the bone image B and the soft tissue image S. Also, a configuration for generating the tables of the thickness of the soft tissue and the thickness of the bone by the method shown in FIG. 8 and performing the same signal processing as in FIG. 6 at a high speed by referring to the tables by the method shown in FIG. 9 can also be used.

Also, as in FIG. 16, a table of the water thickness (W) and the bone thickness (B$_W$) and a table of the fat thickness (A) and the bone thickness (B$_A$) may be generated, and the bone thickness B and the soft tissue thickness S may be obtained using the ratio $\alpha$ of water contained in the soft tissue. Also, the signal processing unit 133 generates a material characteristic image (including a material decomposition image and a material identification image) by energy subtraction processing using the plurality of attenuation rate images (H, L). The signal processing unit 133 estimates the attenuation information (the linear attenuation coefficient or the mass attenuation coefficient) of the decomposition target material contained in the object from pixel values in the material characteristic image (for example, pixel values in the effective atomic number image) or the ratio of the material contained in the object obtained from the material characteristic image (for example, the ratio of the material contained in the soft tissue obtained from the material decomposition image).

Then, the signal processing unit 133 can also generate, by the energy subtraction processing using the plurality of attenuation rate images (H, L), and the estimated attenuation information, an image in which a decomposition target material (for example, the soft tissue or bone contained in the object) is decomposed. In this case, if a linear attenuation coefficient is estimated as the attenuation information of the decomposition target material, the signal processing unit 133 generates a material decomposition image concerning the decomposition target material. Also, if a mass attenuation coefficient is estimated as the attenuation information, the signal processing unit 133 generates a material identification image concerning the decomposition target material.

In each of the above-described first and second embodiments, an indirect X-ray sensor using a phosphor is used as the X-ray imaging apparatus 104. However, the present invention is not limited to this. For example, a direct X-ray sensor using a direct conversion material such as CdTe may be used. That is, the X-ray sensor may be either an indirect or direct X-ray sensor.

In each of the first and second embodiments, for example, the tube voltage of the X-ray generation apparatus 101 is changed in the operation shown in FIG. 4. However, the present invention is not limited to this. The energy of X-rays applied to the X-ray imaging apparatus 104 may be changed by temporally switching the filter of the X-ray generation apparatus 101. That is, the method of changing the energy of X-rays applied to the X-ray imaging apparatus 104 is not particularly limited.

In each of the first and second embodiments, images of different energies are obtained by changing the X-ray energy but the present invention is not limited to this. For example, a stacked configuration for obtaining images of different energies from a front two-dimensional detector and a rear two-dimensional detector with respect to the incident direction of X-rays by overlaying a plurality of phosphors 105 and a plurality of two-dimensional detectors 106 may be used.

In each of the first and second embodiments, the imaging control apparatus 103 of the X-ray imaging system is used to perform the energy subtraction processing. However, the present invention is not limited to this. For example, images obtained by the imaging control apparatus 103 may be transferred to another computer and then the energy subtraction processing may be performed. For example, obtained images may be transferred to another personal computer via a medical PACS, may undergo the energy subtraction processing, and may then be displayed. That is, the apparatus for performing the correction processing described in each of the above embodiments need not be a set with the imaging apparatus (may be an image viewer).

According to the embodiments, it is possible to reduce an erase residue of an unnecessary structure, which may occur in an image after energy subtraction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates an image of a first material and an image of a second material contained in an object, comprising:

a processing unit configured to performing energy subtraction processing using information concerning a plurality of attenuation rates corresponding to a plurality of radiation energies that are different from each other and are obtained by performing imaging in which the object is irradiated with radiation, wherein the processing unit estimates a linear attenuation coefficient of the first material at an energy of the radiation, (a) using at least one of information concerning an effective atomic number and information concerning a surface density that are obtained by the energy subtraction processing, or (b) using at least one of information concerning a thickness of a third material and information concerning a thickness of a fourth material that are contained in the first material obtained by the energy subtraction processing, and (c) using a linear attenuation coefficient of the third material, a density of the third material, a linear attenuation of the fourth material, and a density of the fourth material, and generates an image of the first material and an image of the second material using the linear attenuation coefficient and the information concerning the plurality of attenuation rates.

2. The image processing apparatus according to claim 1, wherein the processing unit estimates the attenuation information of the first material, (a) using pixel values in an image of the effective atomic number, or (b) using ratio information of the third material contained in the first material, which is obtained using an image of the thickness of the third material and an image of the thickness of the fourth material, and generates the image of the first material and the image of the second material by performing the energy subtraction processing using the attenuation information and the information concerning the plurality of attenuation rates.

3. The image processing apparatus according to claim 1, wherein the third material is water contained in a soft tissue of the object, and the fourth material is fat contained in the soft tissue.

4. The image processing apparatus according to claim 1, wherein the first material is a soft tissue contained in the object, and the second material is a bone contained in the object.

5. The image processing apparatus according to claim 1, wherein the processing unit estimates, as the attenuation information, a linear attenuation coefficient of the first material at an energy of the radiation, and generates images decomposed into a thickness of the first material and a thickness of the second material by the energy subtraction processing using the plurality of attenuation rates and the attenuation information.

6. The image processing apparatus according to claim 1, wherein the processing unit uses actually measured values as the linear attenuation coefficient of the third material and the linear attenuation coefficient of the fourth material, or the density of the third material and the density of the fourth material.

7. The image processing apparatus according to claim 1, wherein the processing unit estimates, as the attenuation information, a mass attenuation coefficient of the first material at an energy of the radiation, and generates an image of a surface density of the first material and an image of a surface density of the second material by the energy subtraction processing using the plurality of attenuation rates and the attenuation information.

8. The image processing apparatus according to claim 1, wherein the processing unit includes a first table in which a thickness of the second material and the thickness of the third material are registered in accordance with a combination of the plurality of attenuation rates, and a second table in which the thickness of the second material and the thickness of the fourth material are registered in accordance with the combination of the plurality of attenuation rates.

9. The image processing apparatus according to claim 8, wherein the processing unit obtains a thickness image of the second material based on the thickness of the second material obtained using the first table, the thickness of the second material obtained using the second table, and ratio information of the third material contained in the first material, and obtains a thickness image of the first material based on the thickness of the third material obtained using the first table, the thickness of the fourth material obtained using the second table, and the ratio information.

10. The image processing apparatus according to claim 1, wherein the processing unit estimates the attenuation information of the first material by averaging pixel values in an image of the effective atomic number, and divides the image of the effective atomic number into a plurality of regions, and averages the pixel values of the image of the effective atomic number for each divided region, thereby estimating the attenuation information of the first material in each region.

11. The image processing apparatus according to claim 1, wherein the processing unit estimates the attenuation information of the first material by averaging pixel values in an image of the effective atomic number, and determines a pixel whose effective atomic number exceeds a threshold as a pixel in a region where the second material exists in the image of the effective atomic number, and performs processing such that a pixel value determined as a pixel in the region is not included in the averaging calculation.

12. The image processing apparatus according to claim 1, wherein the processing unit estimates the attenuation information of the first material by averaging pixel values in an image of the effective atomic number, and determines a pixel whose surface density obtained by averaging pixel values obtained by the energy subtraction processing falls below a surface density threshold as a pixel in a region where the object does not exist, and performs processing such that a pixel value determined as a pixel in the region is not included in the averaging calculation.

13. The image processing apparatus according to claim 1, wherein the processing unit estimates the attenuation information of the first material from ratio information of the third material contained in the first material, which is obtained by averaging pixel values of a plurality of pixels in the thickness of the third material and the thickness of the fourth material.

14. The image processing apparatus according to claim 13, wherein the processing unit divides the thickness of the third material and the thickness of the fourth material into a plurality of regions and averages the ratio information for each region, thereby estimating the attenuation information of the first material in each region.

15. The image processing apparatus according to claim 13, wherein the processing unit determines a pixel whose ratio information exceeds a ratio threshold as a pixel in a region where the second material exists in the thickness of the third material and the thickness of the fourth material, and performs processing such that a pixel value determined as a pixel in the region is not included in the averaging calculation.

16. The image processing apparatus according to claim 13, wherein the processing unit determines a pixel for which a total thickness of the third material and the fourth material falls below a thickness threshold as a pixel in a region where the object does not exist, and performs processing such that a pixel value determined as a pixel in the region is not included in the averaging calculation.

17. An image processing method of an image processing apparatus that generates an image of a first material and an image of a second material contained in an object, the image processing method comprising a processing step of performing energy subtraction processing using information concerning a plurality of attenuation rates corresponding to a plurality of radiation energies that are different from each other and are obtained by performing imaging in which an object is irradiated with radiation, wherein in the processing step, a linear attenuation coefficient of the first material at an energy of the radiation is estimated, (a) using at least one of information concerning an effective atomic number and information concerning a surface density that are obtained by the energy subtraction processing, or (b) using at least one of information concerning a thickness of a third material and information concerning a thickness of a fourth material that are contained in the first material obtained by the energy subtraction processing, and (c) using a linear attenuation coefficient of the third material, a density of the third material, a linear attenuation coefficient of the fourth material, and a density of the fourth material, and an image of the first material and an image of the second material is generated using the linear attenuation coefficient and the information concerning the plurality of attenuation rates.

18. A non-transitory computer-readable storage medium storing a program for causing a computer to execute the method according to claim 17.

* * * * *